US011957627B2

(12) United States Patent
Allen

(10) Patent No.: US 11,957,627 B2
(45) Date of Patent: Apr. 16, 2024

(54) SURGICAL TABLE CLADDING PROTECTIVE DEVICE

(71) Applicant: Robert Dan Allen, Newbury, OH (US)

(72) Inventor: Robert Dan Allen, Newbury, OH (US)

( * ) Notice: Subject to any disclaimer, the term of this patent is extended or adjusted under 35 U.S.C. 154(b) by 0 days.

(21) Appl. No.: 17/497,346

(22) Filed: Oct. 8, 2021

(65) Prior Publication Data

US 2022/0110810 A1 Apr. 14, 2022

Related U.S. Application Data

(60) Provisional application No. 63/089,851, filed on Oct. 9, 2020.

(51) Int. Cl.
*A61G 13/10* (2006.01)
*A61G 13/06* (2006.01)

(52) U.S. Cl.
CPC ............. *A61G 13/10* (2013.01); *A61G 13/06* (2013.01)

(58) Field of Classification Search
CPC . A61G 13/06; A61G 13/10; F16P 3/00; F16P 3/001; F16P 3/02
USPC ................................................ 52/834; 5/600
See application file for complete search history.

(56) References Cited

U.S. PATENT DOCUMENTS

| | | | | |
|---|---|---|---|---|
| 5,324,911 | A * | 6/1994 | Cranston ................ | H05B 1/025 219/521 |
| 5,528,782 | A | 6/1996 | Pfeuffer et al. | |
| 6,240,582 | B1 | 6/2001 | Reinke | |
| 8,033,080 | B2 * | 10/2011 | Revenus ................... | F16P 1/00 52/645 |
| 9,233,042 | B1 * | 1/2016 | Freude ................... | A61G 13/10 |
| 9,782,315 | B2 | 10/2017 | Langford | |
| 10,610,435 | B2 * | 4/2020 | Allen ..................... | A61G 7/018 |
| 10,952,913 | B2 * | 3/2021 | Dalbert .................. | A61G 13/10 |
| 2007/0107126 | A1 | 5/2007 | Koch et al. | |
| 2009/0126112 | A1 * | 5/2009 | Kuchenbecker ....... | A61G 13/10 248/415 |
| 2009/0321604 | A1 * | 12/2009 | Revenus ................... | F16P 1/00 248/354.1 |
| 2015/0335512 | A1 * | 11/2015 | Langford ............... | A61G 13/06 5/658 |
| 2017/0000676 | A1 * | 1/2017 | Revenus ............... | A61G 13/04 219/521 |
| 2018/0311101 | A1 * | 11/2018 | Dalbert .................. | A61G 13/06 |
| 2019/0083344 | A1 * | 3/2019 | Allen ..................... | A61G 13/06 |

* cited by examiner

*Primary Examiner* — David R Hare
(74) *Attorney, Agent, or Firm* — Pearne & Gordon LLP

(57) ABSTRACT

A cladding protection device for placement around a column. The cladding protection device including a first guard and a second guard, wherein the first guard and the second guard are couplable to one another to bound a central area dimensioned to receive the column. The first guard including a slot and the second guard including a projection, wherein the projection is configured to engage the slot to thereby couple the first guard to the second guard, and the projection is skewed inwardly toward a center of the central area to enable the projection to engage the slot.

18 Claims, 16 Drawing Sheets

SURGICAL TABLE CLADDING PROTECTIVE DEVICE

CROSS-REFERENCE TO RELATED APPLICATIONS

This application claims priority to, and any other benefit of U.S. Provisional Application Ser. No. 63/089,851, filed Oct. 9, 2020, the entire disclosure of which is incorporated herein by reference as though recited herein in its entirety.

FIELD OF THE INVENTION

The subject application relates generally to a guard device for a surgical table. More particularly, the application relates to a device that protects cladding segments of a height adjustment mechanism used to raise or lower a surgical table.

BACKGROUND

Medical facilities commonly utilize surgical tables that can be repositioned to ergonomically accommodate medical personnel (e.g., surgeons, anesthesiologists, nurses, etc.) performing a medical procedure on a patient. Such surgical tables generally include a repositioning mechanism that is operable to control the level and orientation of the surgical table. The repositioning mechanism is typically surrounded by a telescoping cladding assembly including a plurality of cladding segments arranged between a base and a lower surface of the table.

Many medical personnel use the base of the table to temporarily store items thereon. In some cases, these items may inadvertently be moved against the telescoping cladding assembly. Such items can become lodged beneath a lip of one or more of the cladding segments of the telescoping assembly. This may damage the cladding assembly, thereby rendering the table inoperable. In such cases, this may require a medical institution to incur costs for fixing or replacing a damaged table.

Therefore, it is desirable to provide a cladding protection device that prevents items placed on the base of the table from inadvertently damaging the cladding assembly of the surgical table.

BRIEF SUMMARY

There is provided a cladding protection device for placement around a column. The cladding protection device including a first guard and a second guard, wherein the first guard and the second guard are couplable to one another to bound a central area dimensioned to receive the column. The first guard including a slot and the second guard including a projection, wherein the projection is configured to engage the slot to thereby couple the first guard to the second guard, and the projection is skewed inwardly toward a center of the central area to enable the projection to engage the slot.

In accordance with another aspect, there is provided a cladding protection device for placement around a column. The cladding protection device including a first guard including a coupling element. A second guard includes a mating coupling element. The coupling element is configured to engage the mating coupling element to couple the first guard to the second guard to bound a central area dimensioned to receive the column. A biasing mechanism is attached to at least one of the first guard and the second guard. The biasing mechanism is configured to biasingly engage a side of the column.

In accordance with yet another embodiment, there is provided a method of assembling a cladding protection device about a column. The method includes placing a first guard about a portion of a perimeter of the column; coupling a second guard to the first guard; pivoting the second guard relative to the first guard about the column to bound a remaining portion of the perimeter of the column; and engaging a protrusion of the first guard or the second guard with an opening of the other of the first guard or the second guard to couple the first guard to the second guard and thereby fully bound the perimeter of the column.

BRIEF DESCRIPTION OF THE DRAWINGS

The accompanying drawings, which are not necessarily to scale, show various aspects of the disclosure.

DETAILED DESCRIPTION

Figure 1:
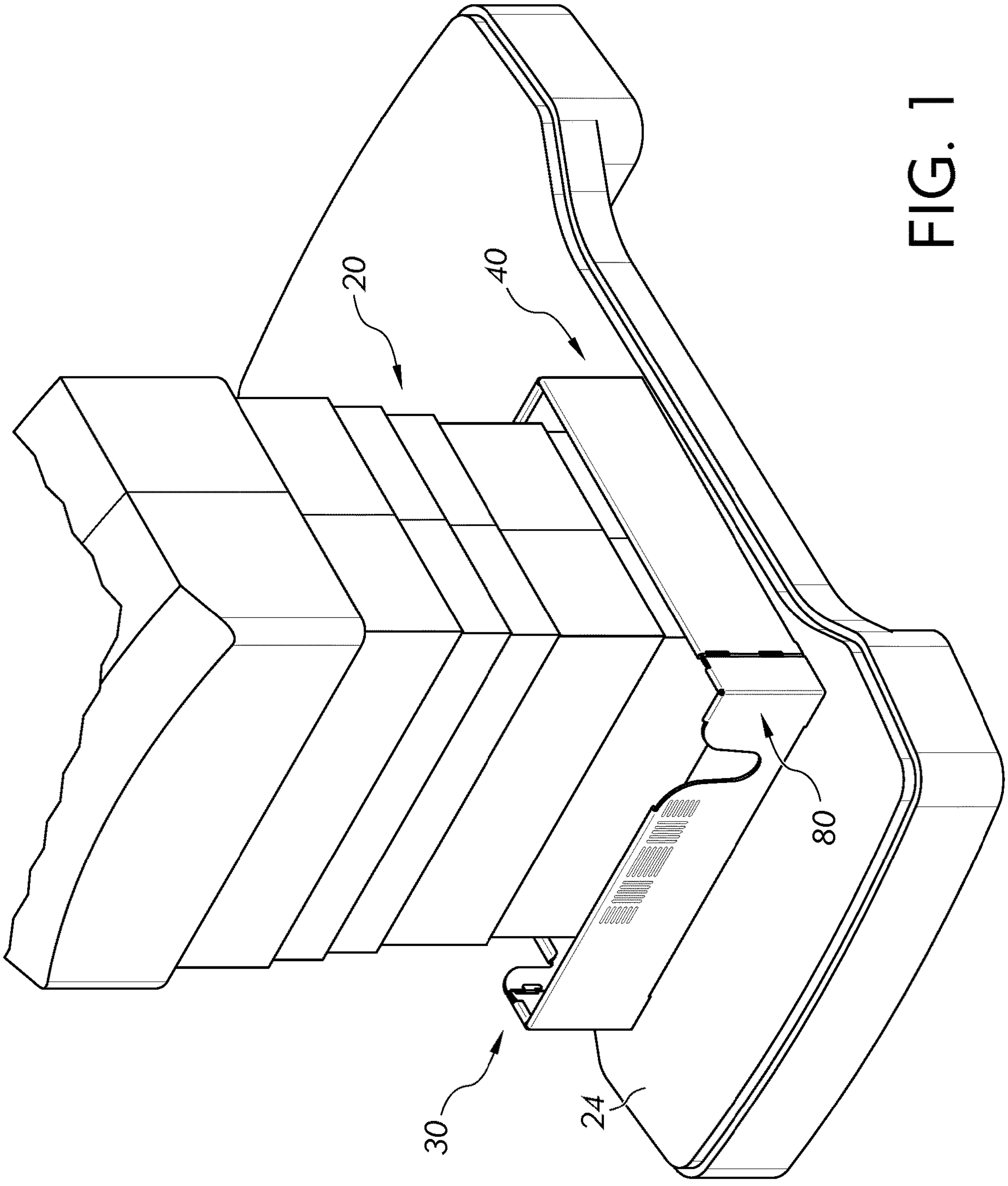
FIG. 1 is a perspective view of a cladding protection device installed about a perimeter of a vertically extending height adjustment mechanism of a surgical table.

Embodiments of the subject application or a component thereof now will be described with reference to the accompanying drawings. Whenever possible, the same reference numerals are used throughout the drawings to refer to the same or like parts.

Figure 2:
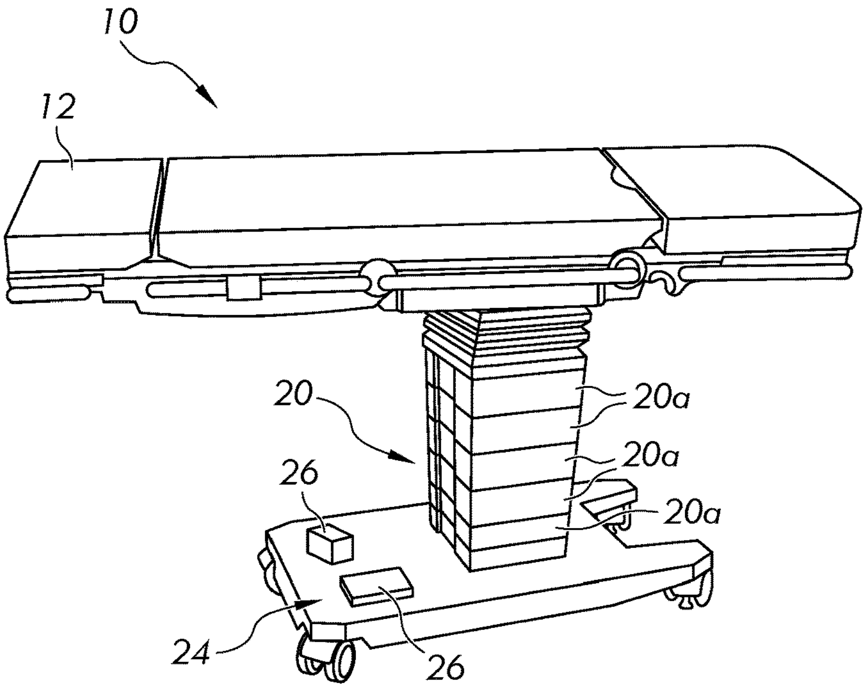
FIG. 2 (PRIOR ART)
FIG. 2 is a perspective view of a surgical table with various items stored on a base of the table, accordingly to the prior art.

Referring first to FIG. 1, a cladding protection device 30 for protecting a height adjustment mechanism 20 of an operating room table 10 (FIG. 2) is shown. Although a surgical or operating table is illustrated in FIG. 2, the various examples of cladding protection devices described herein are suitable for use with other types of hospital or medical-use tables that include a height adjustment mechanism. The height adjustment mechanism 20 is positioned on a base 24.

Referring to FIG. 2 the surgical table 10 includes a patient support surface 12 positioned on an upper end of the height adjustment mechanism 20. The height adjustment mechanism 20 includes a movable shroud or cladding made up of a plurality of telescoping shroud members 20*a*. The telescoping shroud members 20*a* are vertically movable during the upward and downward repositioning of the patient support surface 12 by the height adjustment mechanism 20. Each telescoping shroud member 20*a* is dimensioned to be nested in an upper adjacent member 20*a* when the patient support surface 12 is lowered relative to the base 24 of the table 10. The telescoping shroud members 20*a* are configured to enclose an internal mechanism (e.g., electronic and mechanical controls, not shown) that is operable to reposition the patient support surface 12 relative to the base 24 of the table 10.

Figure 3:
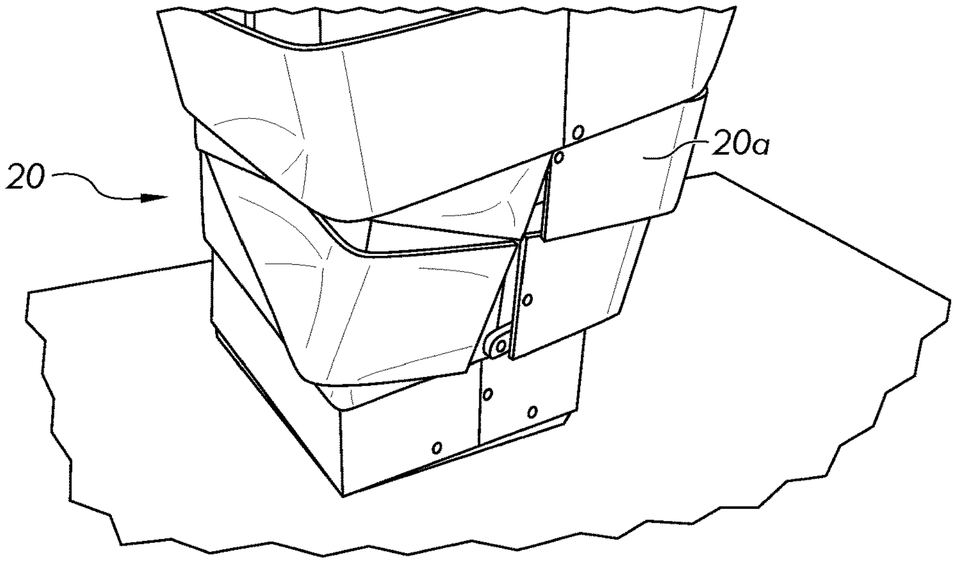
FIG. 3 (PRIOR ART)
FIG. 3 illustrates a damaged surgical table cladding assembly, accordingly to the prior art.

As noted above, it is common for medical personnel (e.g., anesthesiologists, nurses, surgeons, etc.) to store various items 26 (e.g., SDC machines, arm boards, clark sockets, rail clamps, etc.) on the base 24 of the table 10. During surgery, these items 26 may inadvertently become lodged beneath a lip of one of the telescoping shroud members 20*a* of the height adjustment mechanism 20. Such items 26 may damage the height adjustment mechanism 20, for example, when the height adjustment mechanism 20 is operated to lower the patient support surface 12 (FIG. 2), as illustrated in FIG. 3. The various examples of cladding protection devices described herein help to reduce the likelihood that items 26 on the base 24 of the table 10 may damage or otherwise contact the height adjustment mechanism 20.

Figure 4:
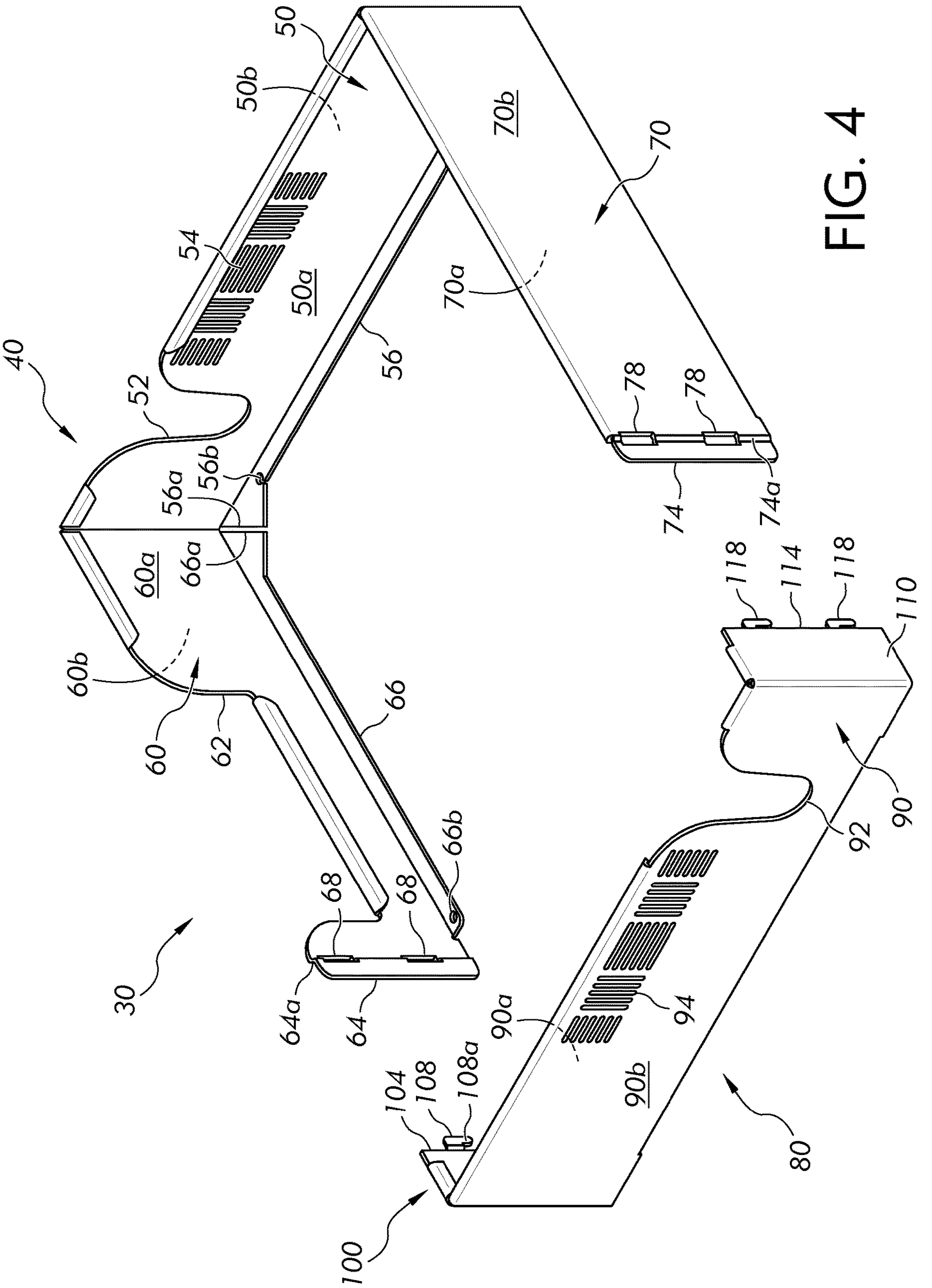
FIG. 4 is an exploded perspective view of the cladding protection device of FIG. 1, illustrating a first guard and a second guard.

Referring to FIG. 4, the cladding protection device 30 includes a first guard 40 and a second guard 80. Each of the guards 40, 80 may be formed of metal having a uniform thickness. It is contemplated that each guard 40 or 80 (or at least a main body thereof without attachments thereto) may be integrally formed from a single piece of metal that is bent, cut, and shaped into the final configuration of the respective guard 40 or 80. In other embodiments, one or more elements of each guard 40, 80 (or even the entire guard) may be formed of one or more other suitable materials, such as for example and not limitation, a plastic material.

The first guard 40, in general, is a U-shaped element having a central wall 50, a first side wall 60 and a second side wall 70. The first side wall 60 and the second side wall 70 extend outwardly in a common direction from opposite ends of the central wall 50. In the embodiment shown, the side walls 60 and 70 extend in a perpendicular direction from the central wall 50. It is contemplated that the side walls 60 and 70 may extend from the central wall 50 at any other angle other than perpendicular based on the shape of the height adjustment mechanism 20.

The central wall 50 may define a first opening 52 extending between an inner surface 50*a* and an outer surface 50*b* thereof. In the embodiment shown, the first opening 52 is substantially U-shaped with a width that gradually increases from a lower end thereof to a top end thereof where the first opening 52 opens to a top edge of the central wall 50. It is contemplated that the first opening 52 may have other shapes and dimensions based on the clearance desired for devices such as wires, cables, or other structures that may be placed on the base 24 of the table 10 or associated with the height adjustment mechanism 20 (FIG. 1).

A second opening 54 may extend between the inner surface 50*a* and the outer surface 50*b* of the central wall 50. In the illustrated embodiment, the second opening 54 is a grated opening configured to allow sufficient transparency (e.g., for the passage of infrared light) for infrared remote controls, if desired.

Figure 5:
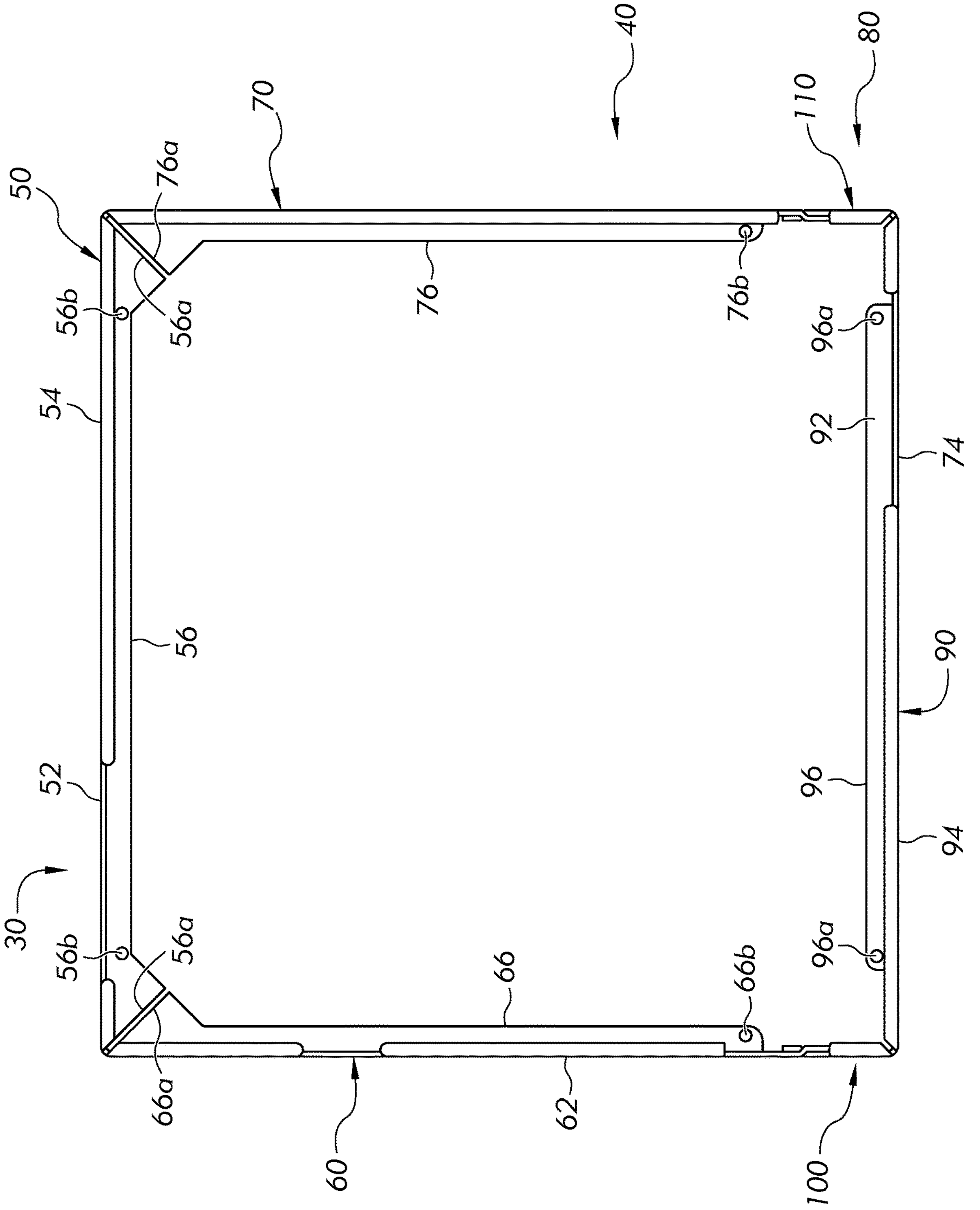
FIG. 5 is a top view of the cladding protection device of FIG. 4, with the first guard and the second guard coupled to each other.

A flange 56 projects inwardly from a lower edge of the central wall 50 along a longitudinal length thereof. In the embodiment shown, the flange 56 extends in a perpendicular direction from the inner surface 50*a* of the central wall 50. It is contemplated that the flange 56 may extend at any other angle with respect to the central wall 50. Referring to FIG. 5, the flange 56 is a substantially rectangular-shaped element and defines a beveled edge 56*a* at a junction of the central wall 50 and the first side wall 60 and at a junction of the central wall 50 and the second side wall 70. It is contemplated that the flange 56 may take on other shapes and forms. One or more mounting holes 56*b* may extend through the flange 56. Each mounting hole 56*b* may be positioned and dimensioned to receive a fastener (not shown) for securing the first guard 40 to the base 24 (FIG. 1) of the table 10 (FIG. 2).

Referring to FIG. 4, the first side wall 60 may extend in a perpendicular direction from the central wall 50. It is contemplated that the first side wall 60 may extend from the central wall 50 at an angle other than perpendicular. The first side wall 60 may define an opening 62 extending between an inner surface 60*a* and an outer surface 60*b* thereof. In the embodiment shown, the opening 62 is substantially rectangular-shaped and opens to a top edge of the first side wall 60. It is contemplated that more than one opening may be formed in the first side wall 60. It is also contemplated that the opening 62 may have other shapes based on the clearance desired for devices such as wires, cables, or other structures that may be placed on the base 24 of the table 10 or associated with the height adjustment mechanism 20 (FIG. 1).

A flange 66 projects inwardly from a lower edge of the first side wall 60 and extends along a substantial length thereof. In the embodiment shown, the flange 66 extends in a perpendicular direction from the inner surface 60*a* of the first side wall 60. It is contemplated that the flange 66 may extend at any other angle with respect to the first side wall 60. In the illustrated example, the flange 66 is a substantially rectangular-shaped element and defines a beveled edge 66*a* at a junction of the first side wall 60 and the central wall 50. It is contemplated that the flange 66 may take on other shapes and forms. One or more mounting holes 66*b* may extend through the flange 66. Each mounting hole 66*b* may be positioned and dimensioned to receive a fastener (not shown) for securing the first guard 40 to the base 24 (FIG. 1) of the table 10 (FIG. 2).

Slots 68 may be formed in a distal end 64 of the first side wall 60 to define first coupling elements of the first guard 40. It is contemplated that the first coupling elements of the first guard 40 may take on other forms (other than slots), for example, but not limited to, clips, hooks, catches, keys, snaps, hinges, grooves, holes, clasps, magnetic elements, elastic elements, etc.

In the embodiment shown, the distal end 64 is offset inwardly relative to an outer surface 60*b* of the first side wall 60, and the slots 68 are formed in a bent portion 64*a* of the distal end 64. The slots 68 extend vertically and are dimensioned and positioned to engage with mating features of the second guard 80, as described in detail below.

Referring to FIG. 5, a flange 76 projects inwardly from a lower edge of the second side wall 70 and extends along a substantial length thereof. In the embodiment shown, the flange 76 extends in a perpendicular direction from an inner surface 70*a* (FIG. 4) of the second side wall 70. It is contemplated that the flange 76 may extend at any other angle with respect to the second side wall 70. In the illustrated example, the flange 76 is a substantially rectangular-shaped element and defines a beveled edge 76*a* at a junction of the second side wall 70 and the central wall 50. It is contemplated that the flange 76 may take on other shapes and forms. One or more mounting holes 76*b* may extend through the flange 76. Each mounting hole 76*b* may be positioned and dimensioned to receive a fastener (not shown) for securing the first guard 40 to the base 24 (FIG. 1) of the table 10 (FIG. 2).

Referring to FIG. 4, slots 78 may be formed in a distal end 74 of the second side wall 70 to define second coupling elements of the first guard 40. In the illustrated embodiment, the distal end 74 is offset inwardly relative to an outer surface 70*b* of the second side wall 70, and the slots 78 are formed in a bent portion 74*a* of the distal end 74. The slots 78 extend vertically and are dimensioned and positioned to engage mating features on the second guard 80, as discussed in detail below. The second guard 80, in general, is a U-shaped element having a central wall 90, a first side wall 100, and a second side wall 110. The first side wall 100 and the second side wall 110 extend outwardly from the central wall 90. In the embodiment shown, the side walls 100 and 110 extend in a perpendicular direction from the central wall 90. It is contemplated that the side walls 100 and 110 may extend from the central wall 90 at any other angle other than perpendicular based on the shape of the height adjustment mechanism 20.

The central wall 90 may include a first opening 92 extending between an inner surface 90*a* and an outer surface 90*b* of the central wall 90. In the embodiment shown, the first opening 92 is generally U-shaped with a width that increases from a lower end thereof to a top end thereof where the first opening 92 opens to a top edge of the central wall 90. It is contemplated that the first opening 92 may have other shapes to provide clearance for devices such as wires, cables, or other structures that may be placed on the base 24 of the table 10 or associated with the height adjustment mechanism 20 (FIG. 1).

A second opening 94 may extend between the inner surface 90*a* and the outer surface 90*b* of the central wall 90. In the embodiment shown, the second opening 94 is a grated opening configured to allow sufficient transparency (e.g., for the passage of infrared light) for infrared remote controls, if desired.

With reference to FIG. 5, a flange 96 may project inwardly from a lower edge of the central wall 90 and extend along a longitudinal length thereof. In the illustrated example, the flange 96 is a rectangular-shaped element that extends in a perpendicular direction from an inner surface 90*a* of the central wall 90. It is contemplated that the flange 96 may extend at any other angle with respect to the central wall 90. It is also contemplated that the flange 96 may take on other shapes and forms. One or more mounting holes 96*a* may extend through the flange 96. Each mounting hole 96*a* may be positioned and dimensioned to receive a fastener (not shown) for securing the second guard 80 to the base 24 (FIG. 1) of the table 10 (FIG. 2).

Figure 6A:
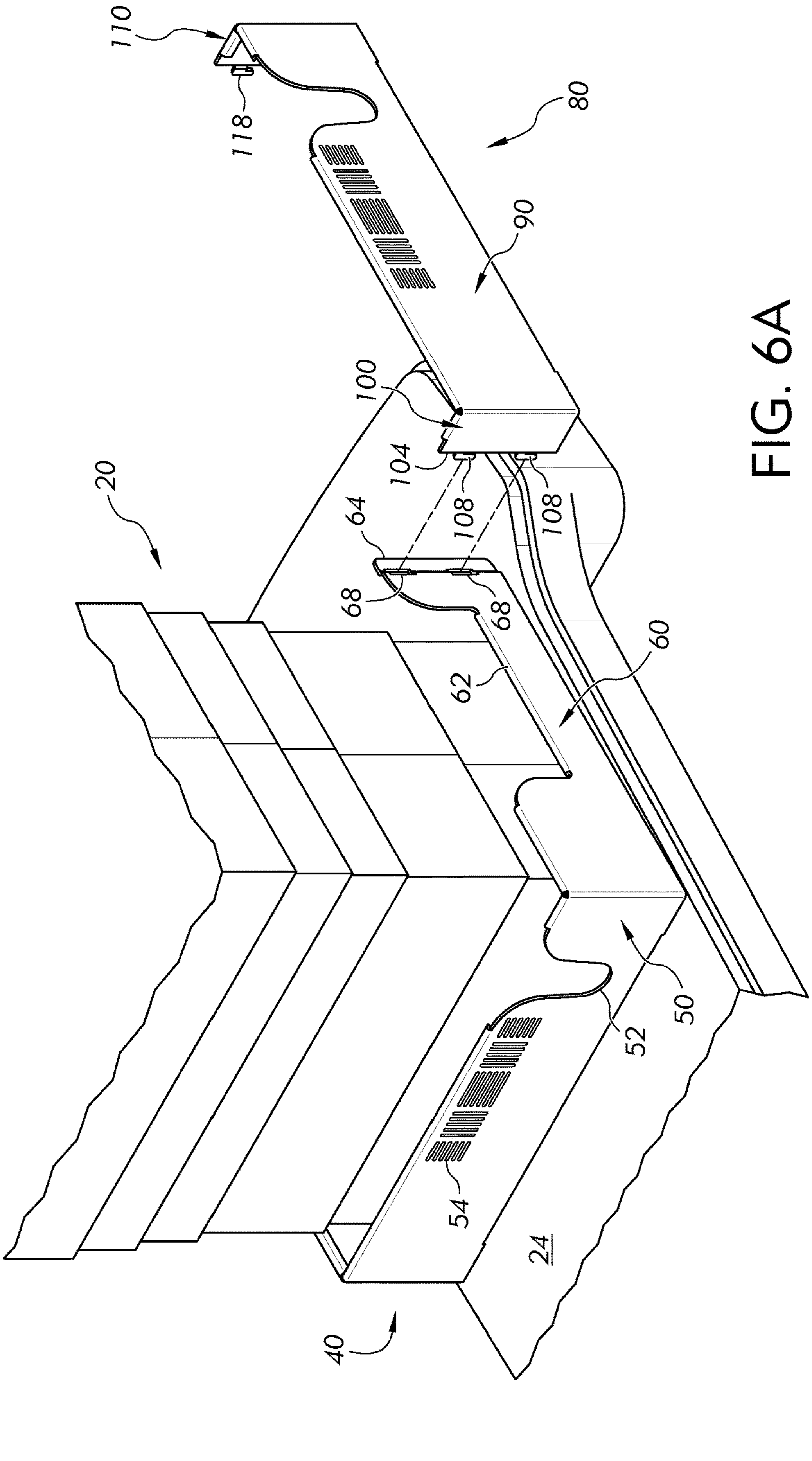
FIG. 6A is a perspective view of the first guard of FIG. 4 installed about the height adjustment mechanism of FIG. 1 with the second guard of FIG. 4 in an uncoupled position relative to the first guard.

Referring to FIG. 6A, projections 108 extend from a distal end 104 of the first side wall 100 to define first mating coupling elements of the second guard 80. It is contemplated that the first mating coupling elements may embody other shapes and forms, for example, but not limited to, clips, slots, catches, keys, snaps, hinges, grooves, holes, clasps, magnetic elements, elastic elements, etc.

Figure 6B:
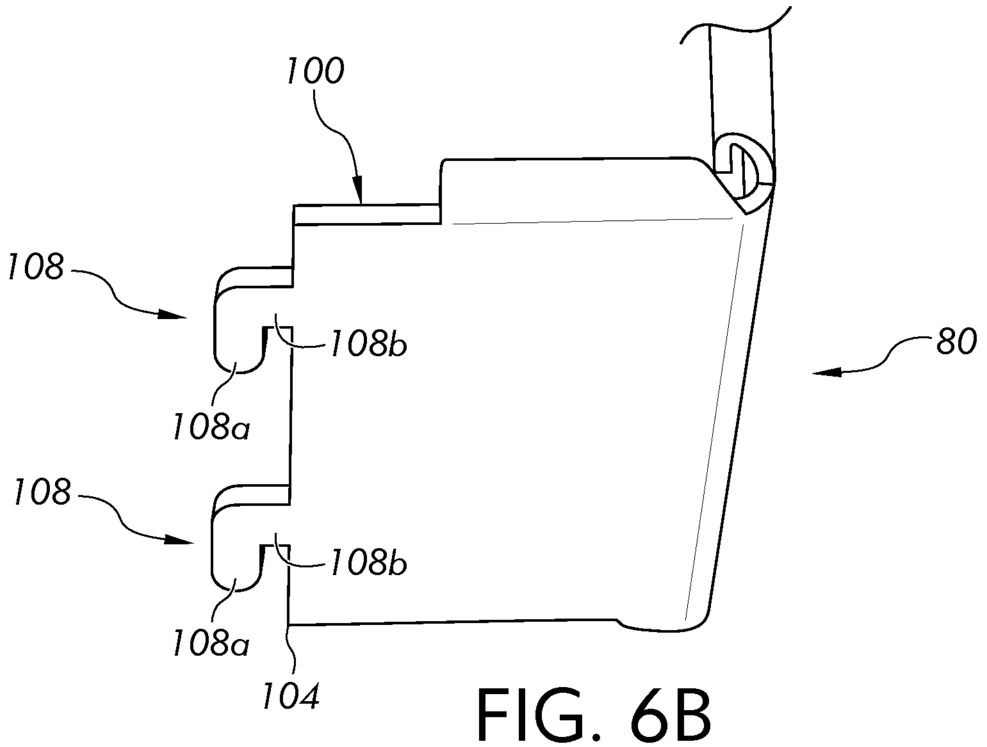
FIG. 6B is an enlarged perspective view of a first side wall of the second guard of FIG. 4.

Referring to FIG. 6B, in the embodiment shown, the projections 108 embody L-shaped elements having tab portions 108*a* extending downwardly from horizontal portions 108*b* thereof. The projections 108 extend from the distal end 104 of the first side wall 100 in a direction that is aligned with the first side wall 100. The projections 108 are dimensioned and positioned to engage the slots 68 (i.e., the first coupling elements) (FIG. 6C) of the first guard 40, as described in detail below.

Figure 8B:
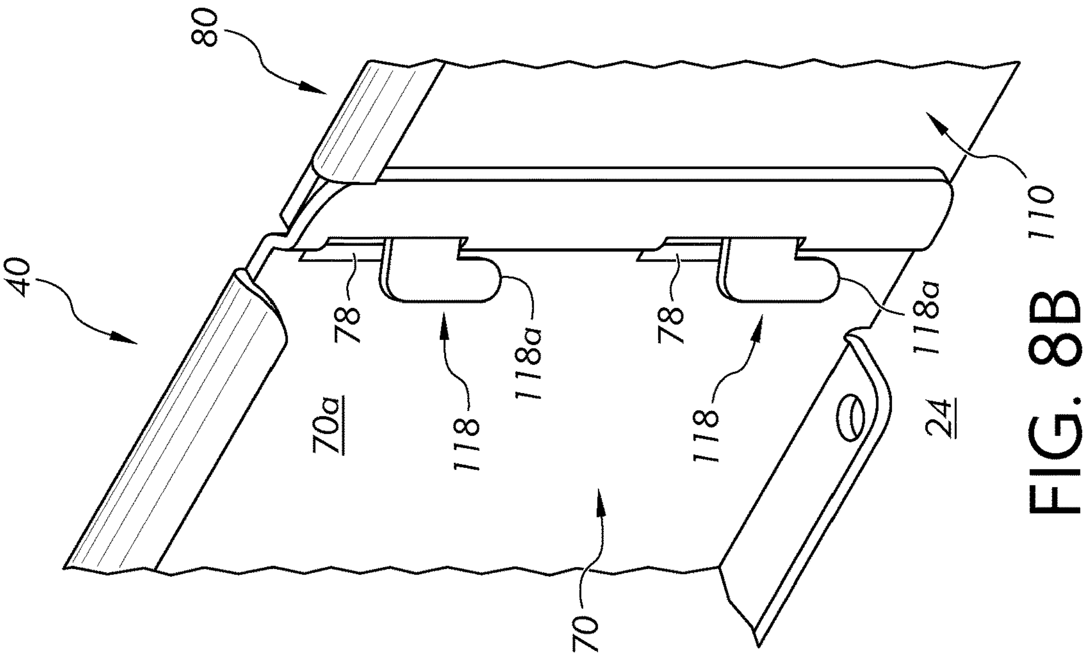
FIG. 8B is an enlarged perspective view of the second side wall of the second guard of FIG. 8A coupled to the second side wall of the first guard of FIG. 8A.
Figure 8A:
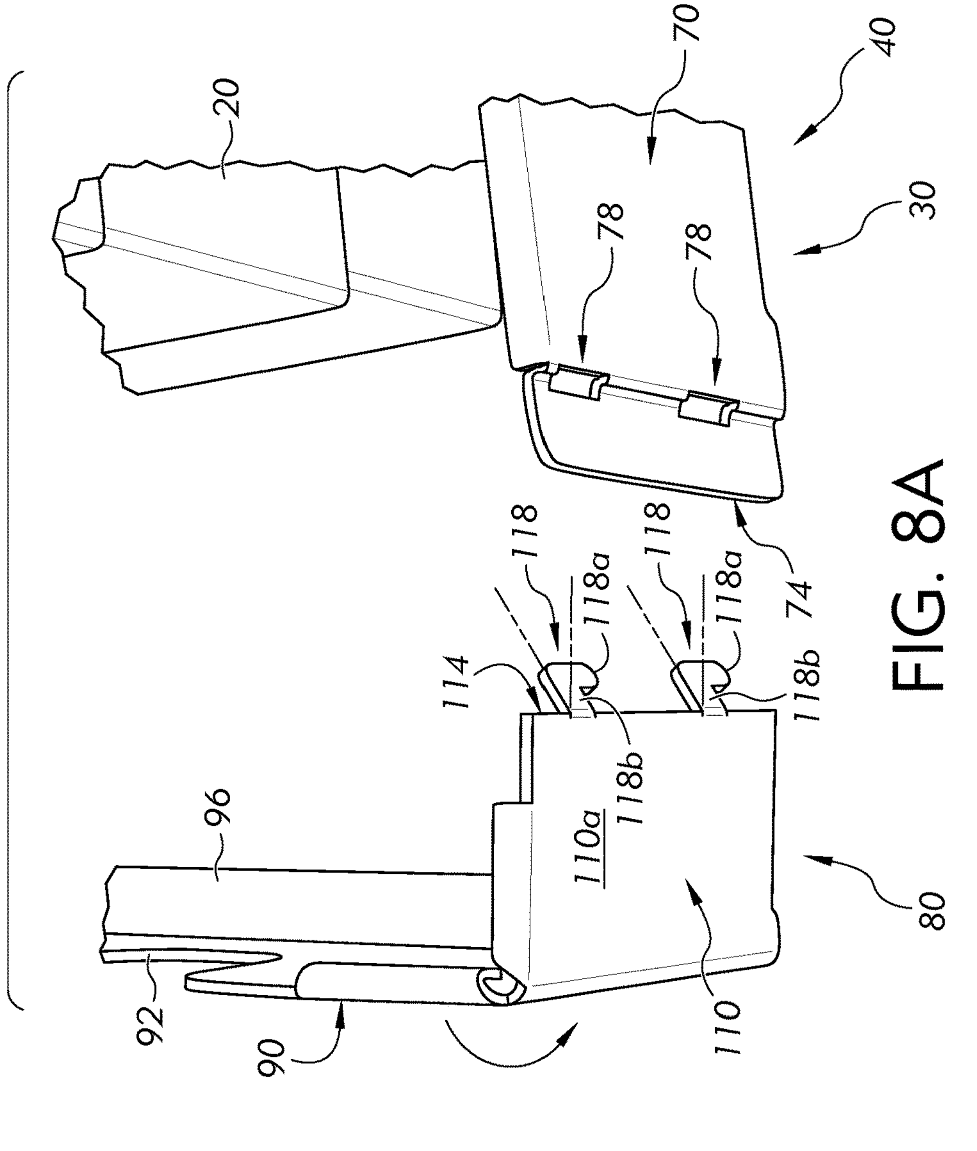
FIG. 8A is an enlarged perspective view of a second side wall of the second guard of FIG. 4 positioned adjacent to a second side wall of the first guard of FIG. 4.

Referring to FIG. 8A, projections 118 extend from a distal end 114 of the second side wall 110 to define second mating coupling elements of the second guard 80. In the embodiment shown, the projections 118 embody L-shaped elements having tab portions 118*a* extending downwardly from horizontal portions 118*b* thereof. The projections 118 are shown as being skewed or bent inwardly relative to an outer surface 110*a* of the second side wall 110, e.g., bent inwardly toward the height adjustment mechanism 20. It is contemplated that the projections 118 may be bent inwardly at an angle between about 40 degrees and about 50 degrees relative to the outer surface 110*a* of the second side wall 110, preferably about 45 degrees. The projections 118 are dimensioned and positioned to engage the slots 78 (i.e., the second coupling elements) of the first guard 40, as discussed in detail below.

Referring to FIG. 4, the first guard 40 includes the first coupling elements (e.g., the slots 68) and the second coupling elements (e.g., the slots 78), and the second guard 80 includes the first mating coupling elements (e.g., the projections 108) and the second mating coupling elements (e.g., the projections 118). In an alternative embodiment (not shown), it is contemplated that the first coupling elements may be formed in the second guard 80 and the first mating coupling elements may be formed in the first guard 40 so long as the first coupling elements and the first mating coupling elements allow the first guard 40 and the second guard 80 to pivot relative to each other. In other embodiments (not shown), the first guard 40 and/or the second guard 80 may include both the first coupling elements and the first mating coupling elements so long as the first coupling elements and the first mating coupling elements allow the first guard 40 and the second guard 80 to pivot relative to each other. It is also contemplated that the number of respective coupling elements and/or mating coupling elements may be fewer or greater than that shown in the embodiments without departing from the scope of the present disclosure.

In the embodiment described above, the first guard 40 and the second guard 80 both are generally U-shaped elements with respective central walls, first side walls and second side walls. It is contemplated that the first guard 40 and the second guard 80 may have other shapes, for example, but not limited to, L-shaped, arcuate, etc. so long as the first guard 40 includes a first distal end with first coupling elements and an opposite second distal end with second coupling elements, and the second guard 80 includes a first distal end with first mating coupling elements and a second distal end with second mating coupling elements so that the first guard 40 and the second guard 80 may be coupled together to bound a central area.

Referring to FIGS. 6A-8, the cladding protection device 30 will be described with respect to assembling the device 30 about the height adjustment mechanism 20. Turning first to FIGS. 6A and 6B, the first guard 40 is positioned on the base 24 about the perimeter of the height adjustment mechanism 20 to at least partially enclose or surround the height adjustment mechanism 20. Next, an initial engagement step is performed whereby the projections 108 extending from the first side wall 100 of the second guard 80 engage the slots 68 formed in the first side wall 60 of the first guard 40. This initial engagement includes arranging the second guard 80 at a position offset from its final assembled position with respect to the first guard 40. In the embodiment shown wherein the second guard 80 includes the projections 108, the second guard 80 is positioned so that the projections 108 may be inserted into the slots 68 in the first guard 40. It is contemplated that the second guard 80 may be positioned such that the first side wall 100 thereof is substantially perpendicular to the first side wall 60 of the first guard 40. However, it is contemplated that the first side wall 100 may be positioned at other angles so long as the projections 108 may be inserted into the slots 68.

Figure 6C:
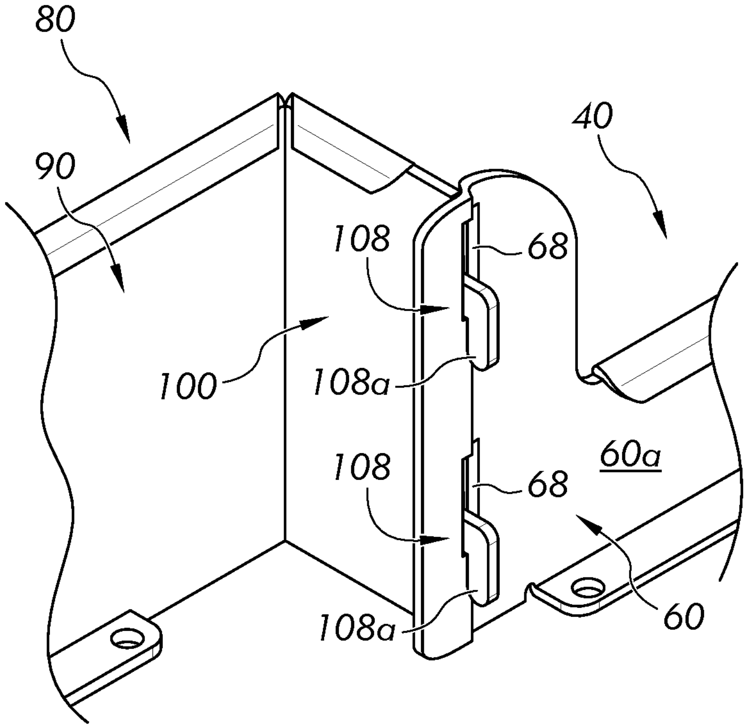
FIG. 6C is an enlarged perspective view of the first side wall of the second guard of FIG. 6A coupled to a first side wall of the first guard of FIG. 4.

The projections 108 and the slots 68 may be positioned and dimensioned so that once the tab portions 108*a* pass into the slots 68, the second guard 80 may be lowered such that the tab portions 108*a* extend below a lower edge of the slots 68, as shown in FIG. 6C. In this position, the tab portions 108*a* secure the second guard 80 to the first guard 40 to prevent the first side wall 60 of the first guard 40 from being detached from the first side wall 100 of the second guard 80. It is contemplated that the projections 108 and slots 68 may be positioned and dimensioned so that once the second guard 80 is lowered, a lower edge of the horizontal portions 108*b* of the projections 108 engage or are slightly offset from the corresponding lower edge of the slots 68.

Figure 7:
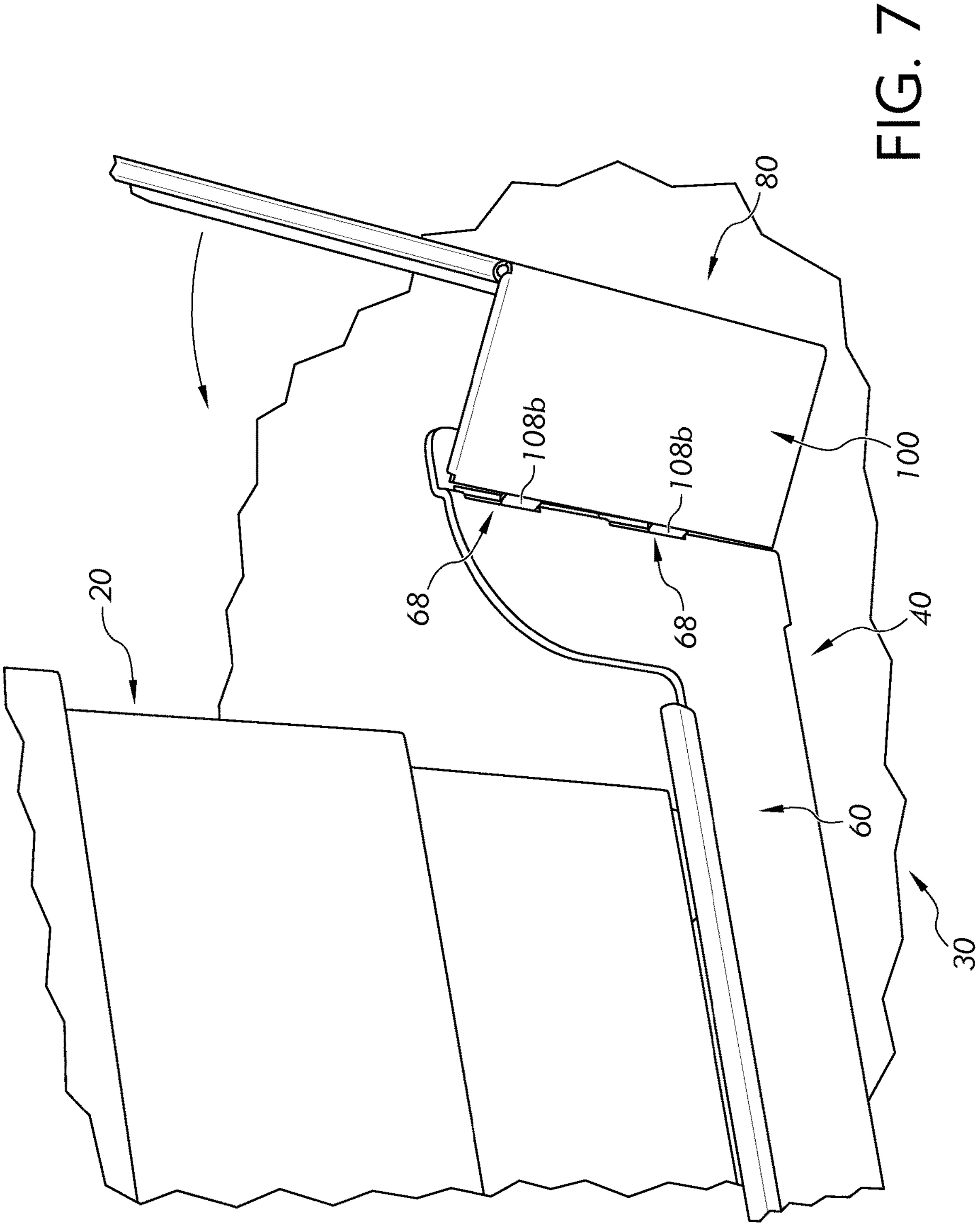
FIG. 7 is an enlarged perspective view of the second guard of FIG. 4 pivoted relative to the first the first guard of FIG. 4.

Turning now to FIG. 7, with the projections 108 (FIG. 6C) fully engaged with the slots 68, the second guard 80 is pivoted relative to the first guard 40 about the height adjustment mechanism 20. In particular, the projections 108 and the slot 68 function as hinges or pivot points that allow the second guard 80 to freely rotate relative to the first guard 40 when the projections 108 (FIG. 6C) are extended through the slots 68 in the first side wall 60 of the first guard 40.

Referring to FIGS. 8A and 8B, the second guard 80 is rotated until the second side wall 110 thereof is substantially aligned with the second side wall 70 of the first guard 40. In this position, the projections 118 extending from the second side wall 110 of the second guard 80 engage the slots 78 formed in the second side wall 70 of the first guard 40. It is noted that the bend or skew of the projections 118 inwardly relative to the second side wall 110 enables the projections 118 to be received by the slots 78 in a state wherein the second side wall 110 of the second guard 80 is substantially parallel to and aligned with the second side wall 70 of the first guard 40. In other words, the projections 118 are bent or skewed to enable them to extend through the slots 78 when the second side wall 110 of the second guard 80 is moved into engagement with the second side wall 70 of the first guard 40. It is contemplated that the second side wall 110 may be lifted slightly to enable the projections 118 (and the tab portions 118*a* thereof) to clear the slots 78 and be extended therethrough.

Referring to FIG. 8B, when the projections 118 are extended through the slots 78, the second side wall 110 of the second guard 80 may be lowered to rest on the base 24 of the table 10 (FIG. 2). As the second guard 80 is lowered, the tab portions 118*a* of the projections 118 extend below a lower edge of the slots 78 to prevent the second side wall 70 of the first guard 40 from being detached from the second side wall 110 of the second guard 80. In other words, the tab portions 118*a* secure the second side wall 70 of the first guard 40 to the second side wall 110 of the second guard 80. With the projections 118 fully engaged with the slots 78, the cladding protection device 30 (FIG. 1) will a bound the central area that is dimensioned to enclose or surround the entire lower perimeter of the height adjustment mechanism 20 (FIG. 1).

Referring to FIG. 5, in this configuration, fasteners (not shown) may be extended through the mounting holes 56*b*, 66*b*, 76*b*, and 96*a* formed in the respective flanges 56, 66, 76, and 97 to secure the cladding protection device 30 to the base 24 (FIG. 1) of the table 10 (FIG. 2). In this manner, the flanges 56, 66, 76, and 96 serve to secure the cladding protection device 30 to the base 24 (FIG. 1) of the table 10 (FIG. 2) to inhibit the cladding protection device 30 from moving thereon.

In the illustrated examples, the cladding protection device 30 of the first embodiment is configured to surround the entire perimeter of the height adjustment mechanism 20 (FIG. 1). In other embodiments, it is contemplated that the cladding protection device 30 may bound less than the entire perimeter (not shown) of the height adjustment mechanism 20 (FIG. 1). Additionally, the cladding protection device 30 may protect a predetermined vertical distance of the height adjustment mechanism 20 (FIG. 1), for example up to about 12 inches relative to the base 24 (FIG. 1) of the table (FIG. 2). In other embodiments (not shown), the cladding protection device 30 may be configured to protect a lesser or greater vertical extent of the height adjustment mechanism 20 (FIG. 1). In some embodiments, it is contemplated that the first and second guards 40 and 80 may respectively include more than three vertically extending walls based on the shape of the height adjustment mechanism 20. It is also contemplated that the walls may extend at different angles versus that which is shown in the illustrated embodiments. It is also contemplated that an in alternative embodiment (not shown) the projections 118 may be formed in the first guard 40 and the slots 78 in the second guard 80 so that the cladding protection device 30 is assembled by rotating the first guard 40 relative to the second guard 80.

Referring now to FIGS. 9A-10B, second and third embodiments of cladding protection devices 130, 230 will now be described. Generally, these embodiments are directed to cladding protection devices with biasing mechanisms configured to engage opposite sides of a height adjustment mechanism, respectively, for hindering movement of the cladding protection device relative to the height adjustment mechanism. The second and third embodiments share some similarities with the cladding protection device 30 of the first embodiment. Thus, similar references numbers (+100) will be used for similar features. Further, a description of similar features has been omitted for brevity.

Figure 9A:
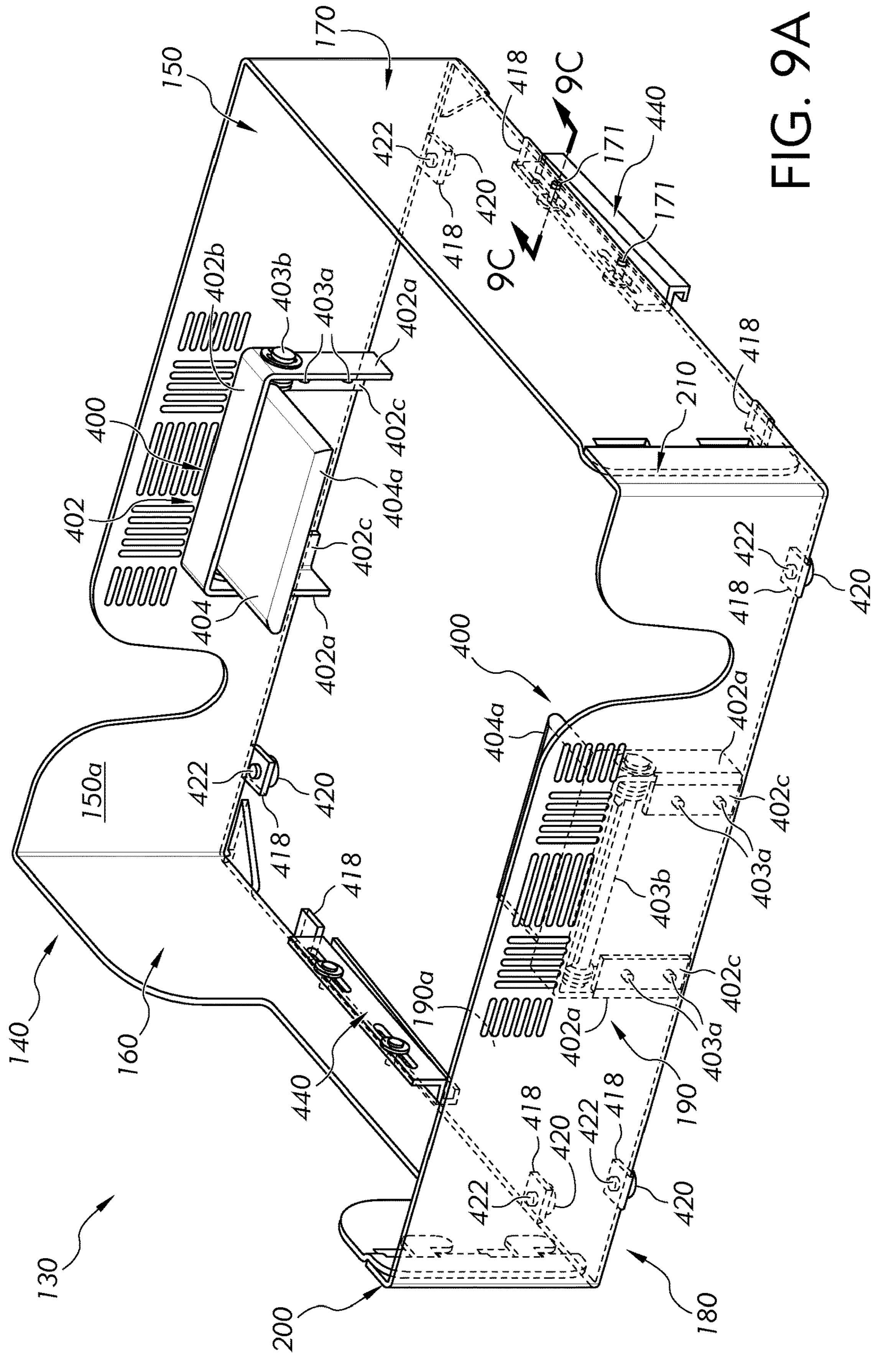
FIG. 9A is a perspective view of the cladding protection device, according to a second embodiment, wherein the cladding protection device includes biasing mechanisms, according to a first embodiment.

Turning now to FIG. 9A, the cladding protection device 130 of the second embodiment includes a first guard 140 and a second guard 180. The first guard 140 includes a central wall 150, a first side wall 160, and a second side wall 170. The first side wall 160 and the second side wall 170 extend outwardly from the central wall 150. In the embodiment shown, the side walls 160 and 170 extend in a perpendicular direction from the central wall 150. It is contemplated that the side walls 160 and 170 may extend from the central wall 150 at any other angle other than perpendicular based on the shape of the height adjustment mechanism 20 (FIG. 9E).

The second guard 180 includes a central wall 190, a first side wall 200, and a second side wall 210. The first side wall 200 and the second side wall 210 extend outwardly from the central wall 190. In the embodiment shown, the side walls 200 and 210 extend in a perpendicular direction from the central wall 190. It is contemplated that the side walls 200 and 210 may extend from the central wall 190 at any other angle other than perpendicular based on the shape of the height adjustment mechanism 20 (FIG. 9E).

Biasing mechanisms 400 may be mounted on inner surfaces of the central walls 150 and 190 of the first and second guards 140 and 180, respectively. In the following description, the biasing mechanisms 400 will be described referring to the biasing mechanism 400 mounted on the inner surface 150*a* of the central wall 150 of the first guard 140. It should be appreciated that the following description also applies to the biasing mechanism 400 mounted on the inner surface 190*a* of the central wall 190 of the second guard 180. It also should be appreciated that the central wall 190 of the second guard 180 may include similar features for affixing the respective biasing mechanism 400 thereto.

Each biasing mechanism 400, in general, includes a frame 402 having a pair of legs 402*a* spaced apart and connected by an overhang portion 402*b*. In the embodiment shown, the legs 402*a* embody L-shaped elements that extend vertically along the inner surface 150*a* of the central wall 150, and the overhang portion 402*b* extends horizontally between the legs 402*a*. Each leg 402*a* may include a flange 402*c* affixed to the inner surface 150*a* of the central wall 150, and one or more openings 403*a* may extend through the flange 402*c*. Each opening 403*a* may be dimensioned to receive a fastener (not shown) for securing the respective leg 402*a* to the inner surface 150*a* of the central wall 150. It is contemplated that the legs 402*a* may be secured to the central wall 150 using other fastening methods, for example but not limited to, welding.

A plate 404 may be pivotally connected to each leg 402*a* via a pivot pin or shaft 403*b* extending between the legs 402*a*. The plate 404 may pivot between a vertical position (not shown) and a horizontal or default position (as shown). In the default position, the plate 404 extends toward a center of the central space bounded by the first and second guards 140, 180. The shaft 403*b* may be spring-biased such that the plate 404 is urged toward the default position. In some embodiments, it is contemplated that a distal end 404*a* of the plate 404 may be made with a non-marring material (e.g., rubber) to prevent the plate 404 scratching or otherwise damaging a respective side of the height adjustment mechanism 20 (FIG. 9E) when engaged therewith, as discussed in detail below.

A plurality of tabs 418 may extend inwardly from lower edges of the central walls 150 and 190 of the first and second guards 180 and 190, respectively, and from lower edges of the first and second side walls 160 and 170 of the first guard 140. Mounting feet 420 may be attached to the tabs 418. It is contemplated that tabs 418 with mounting feet 420 may also be disposed along the lower edges of the first and second side walls 200, 210 of the second guard 180. Each tab 418 may define an opening (not shown) for receiving a fastener 422 to affix a respective mounting foot 420 thereto. Each mounting foot 420 may be made of a rubber or another suitable material to prevent the cladding protection device 130 from scratching or otherwise damaging the base 24 (FIG. 9E) of the table (FIG. 2).

Figure 9B:
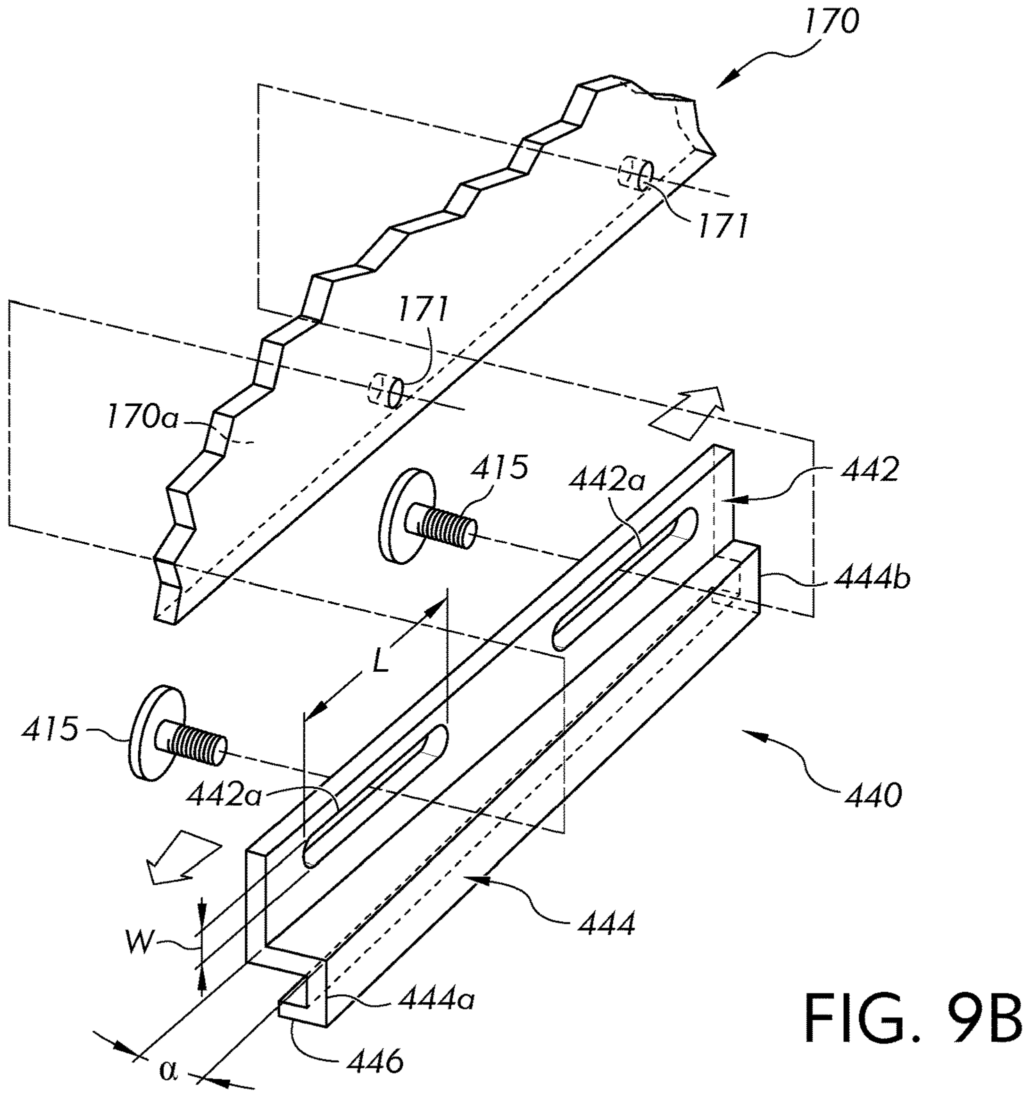
FIG. 9B is a partially sectioned, exploded view of a coupler of the cladding protection device of FIG. 9A.
Figure 9C:
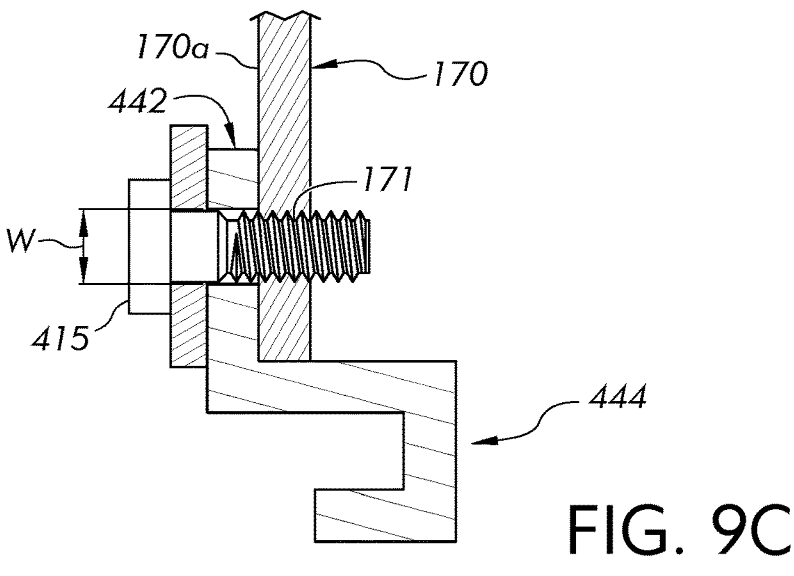
FIG. 9C is an enlarged sectioned view of the coupler of FIG. 9B attached to the side wall of the cladding protection device of FIG. 9A.
Figure 9D:
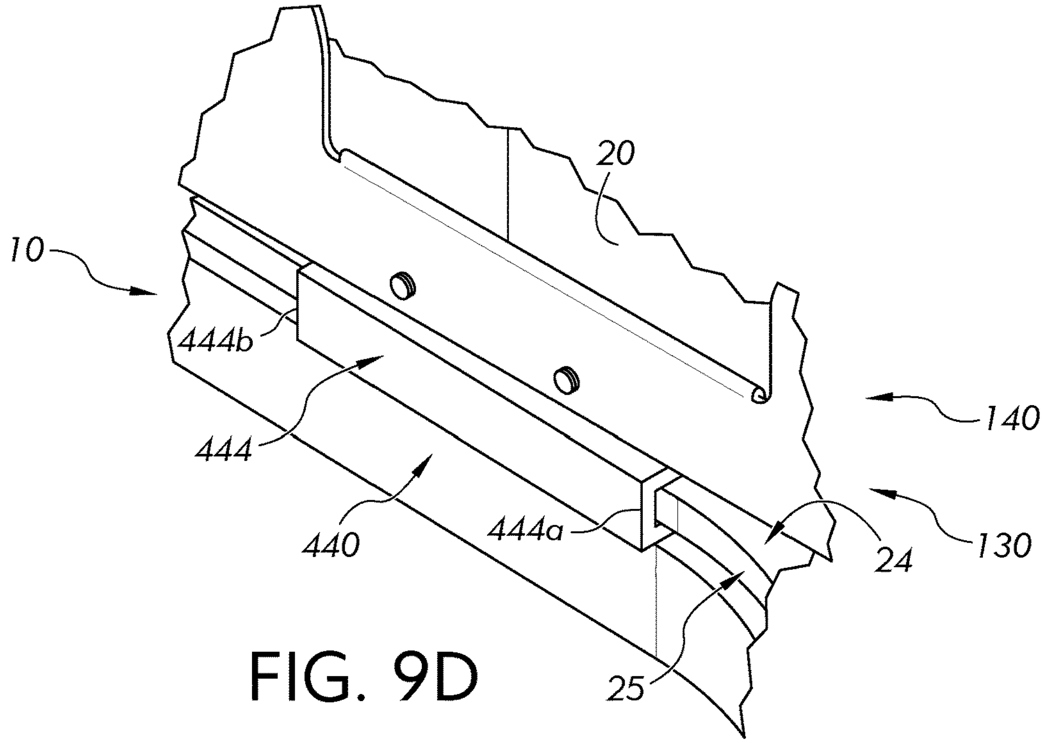
FIG. 9D is an enlarged perspective view of the coupler of FIG. 9B engaged with a base of a surgical table.
Figure 9E:
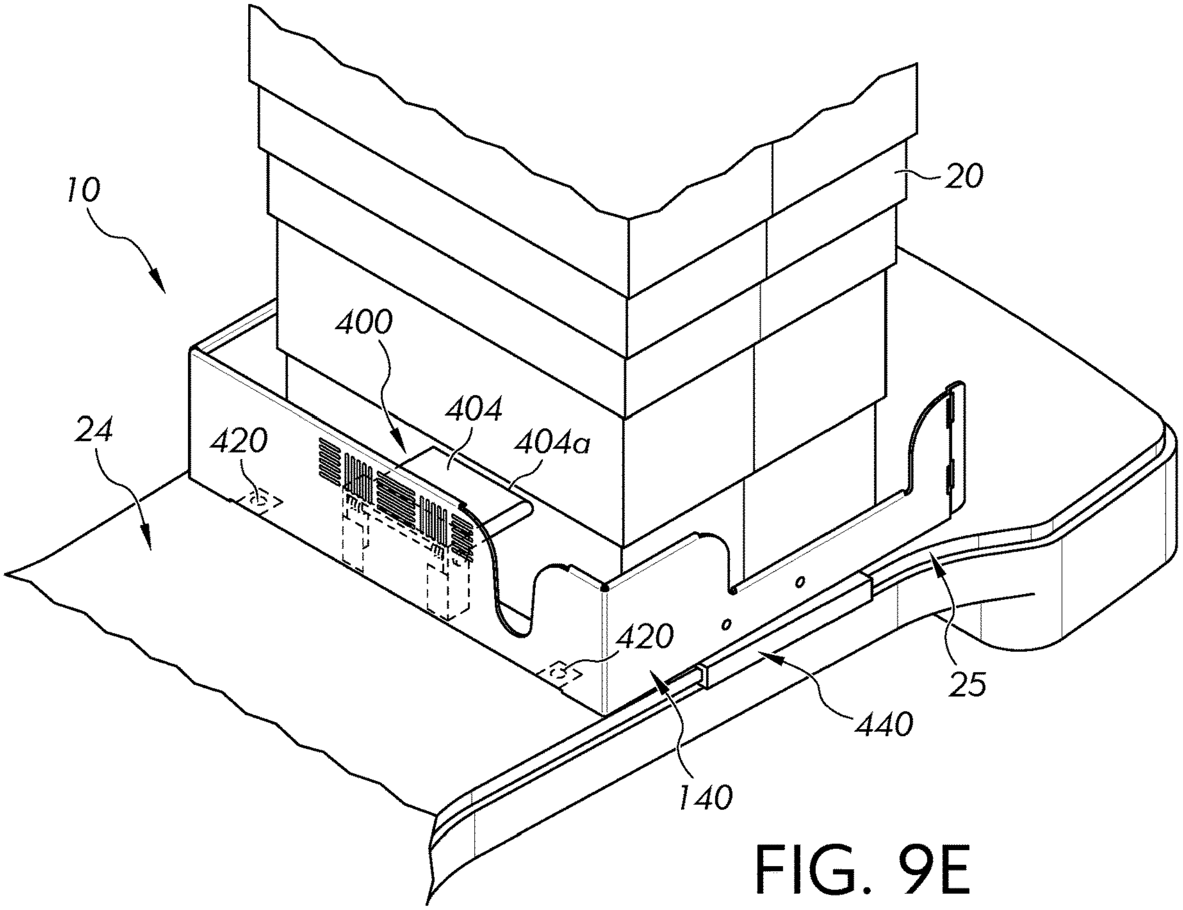
FIG. 9E is a perspective view of a first guard of the cladding protection device of FIG. 9A installed about a height adjustment mechanism of a surgical table.

Referring to FIGS. 9A-9C, couplers 440 may be attached to lower longitudinal portions of the first and second side walls 160, 170 of the first guard 140, respectively. In the following description, the coupler 440 will be described referring to the second side wall 170 of the first guard 140. It should be appreciated that the following description similarly applies to the coupler 440 attached to the lower portion of the first side wall 160. It should also be appreciated that the first side wall 160 may include similar features for securing the respective coupler 440 thereto.

The coupler 440 may include a body portion 442 that is attached to the inner surface 170*a* of the second side wall 170. In the illustrated example, the body portion 442 includes one or more slots 442*a* that extend horizontally along the body portion 442. Each slot 442*a* may be dimensioned to receive a fastener 415 (e.g., a bolt and washer). A width (W) of the slots 442*a* may be dimensioned to allow the coupler 440 to slide relative to the fasteners 415, as described in detail below.

The fasteners 415 are dimensioned to extend through their respective slots 442*a* and thread into threaded holes 171 formed in the second side wall 170 to secure the coupler 440 to the second side wall 170. The lengths (L) of the slots 442*a* are dimensioned so that when the fasteners 415 secure the coupler 440 to the second side wall 170, the coupler 440 may slide relative to the second side wall 170 in a generally horizontal direction, as described in detail below.

A lower portion of the coupler 440 is contoured to form a generally U-shaped channel 444 that extends longitudinally along the coupler 440. The channel 444 is dimensioned to receive an edge 25 (FIG. 9D) of the base 24 (FIG. 9D) of the table (FIG. 2), as described in detail below. In the embodiment shown, the channel 444 includes a first end 444*a* and a second end 444*b*. The channel 444 is skewed relative to the body portion 442 of the coupler 440 such that a depth of the channel 444 at the first end 444*a* is larger than a depth of the channel 444 at the second end 444*b*. It is contemplated that the channel 444 may be skewed at a predetermined angle $\alpha$, preferably between 0 and 20°. In other embodiments (not shown), it is contemplated that the channel is not skewed, e.g., such that the depth of the channel is the same at both the first and second ends 444*a*, 444*b*.

Referring to FIGS. 9A-9G, the cladding protection device 130 will be described with respect to assembling the device 130 about the height adjustment mechanism 20. Similar to the device 30, described in detail above, the first guard 140 of the device 130 is installed on the base 24 about the height adjustment mechanism 20. Specifically, the first guard 140 is positioned on the base 24 of the table 10 such that the couplers 440 may engage respective edges 25 of the base 24 of the table 10. As described in detail above, the couplers 440 are configured to slide relative to the side walls 160, 170 of the first guard 140. As the couplers 440 slide, the channels 444 of the couplers 440 may engage the respective edges 25 of the base 24 to secure the first guard 140 to the base 24. See, FIG. 9D.

Positioning of the first guard 140 on the base 24 may also include positioning the biasing mechanism 400 affixed to the first guard 140 into engagement with a respective side of the height adjustment mechanism 20. See, FIG. 9E. Thereafter, the second guard 180 is coupled to the first guard 140 in a substantially similar way as described above with respect to the second guard 80 of the device 30. Thus, a detailed description of this engagement has been omitted for brevity.

Figure 9F:
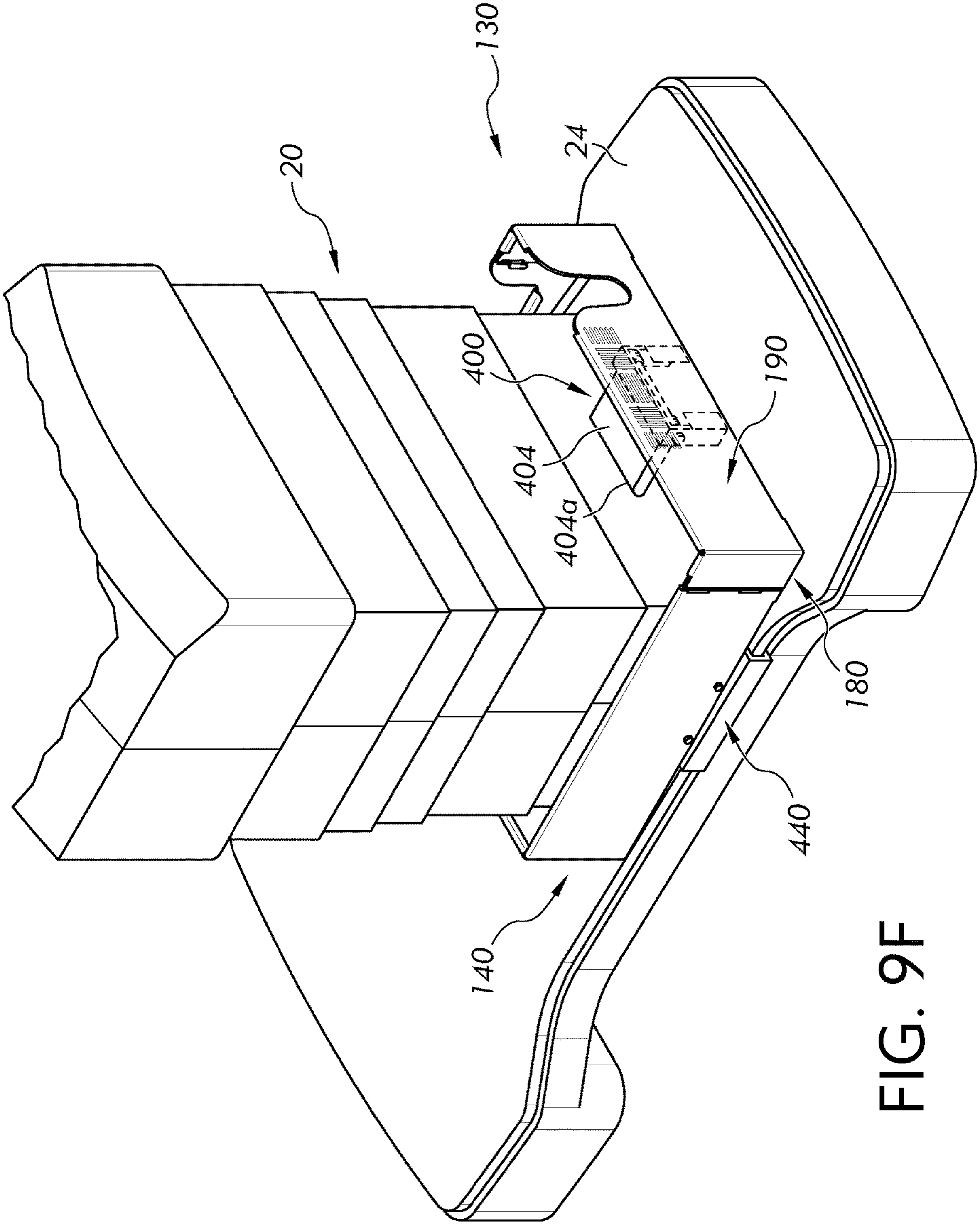
FIG. 9F is a perspective view of the first guard and a second guard of the cladding protection device of FIG. 9A installed about a perimeter of the height adjustment mechanism of the surgical table.

Referring to FIG. 9F, when the second guard 180 is positioned on the base 24 about the height adjustment mechanism 20, the biasing mechanisms 400 of both the first and second guards 140, 180 will engage the respective sides of the height adjustment mechanism 20. The biasing mechanisms 400 are configured to hinder the cladding protection device 130 from moving in a horizontal direction with respect to the height adjustment mechanism 20. Specifically, distal ends 404*a* of the plates 404 are positioned and dimensioned to engage the respective sides of the height adjustment mechanism 20 to hinder the cladding protection device 130 from moving relative to the height adjustment mechanism 20.

Figure 9G:
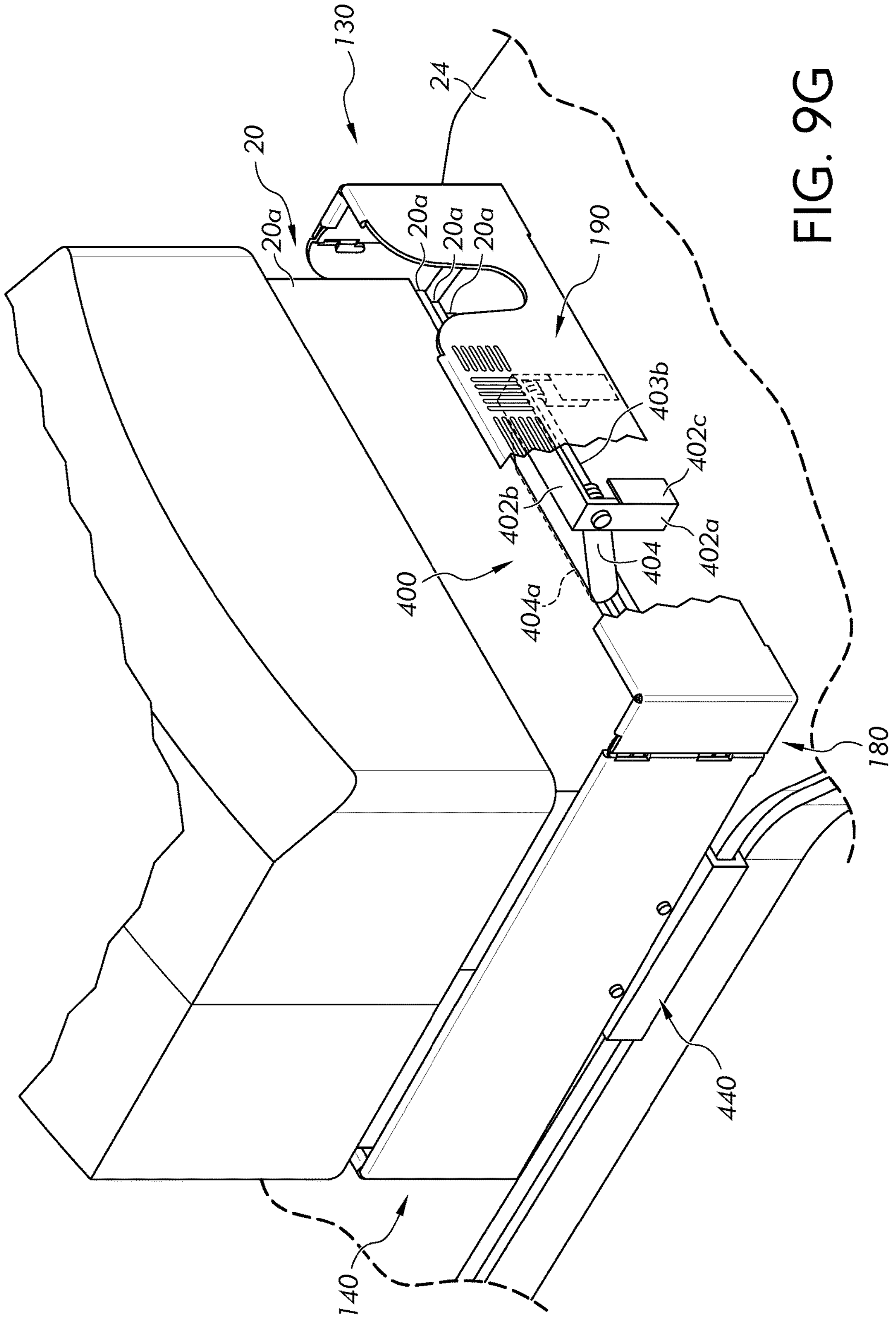
FIG. 9G is a perspective view of the biasing mechanism of FIG. 9A engaged against the height adjustment mechanism of the surgical table and in an offset position.

Referring to FIG. 9G, when it is desired to lower the patient support surface 12 (FIG. 2), the height adjustment mechanism 20 may be operated to nest the lower (narrower) shroud members 20*a* into the adjacent upper (wider) shroud members 20*a*. In this manner, as the upper telescoping shroud members 20*a* descend downwardly to receive the lower telescoping members 20*a* the width of the height adjustment mechanism 20 (proximate the biasing mechanisms 400) increases progressively. As the upper shroud members 20*a* approach the base 24, they will engage the distal ends 404*a* of the plates 404, thereby forcing the plates 404 to pivot downwardly to an offset position. Because the plates 404 are biased to the default position, as the plates 404 are forced to the offset position they will apply a reactionary force to the cladding protection device 130 that hinders the cladding protection device 130 from moving toward the height adjustment mechanism 20. This force helps to hinder the cladding protection device 130 from engaging the shroud members 20*a* and causing damage. As noted above, it is contemplated that the distal ends 404*a* of the plates 404 may be made with or covered with a non-marring material to reduce the likelihood of damaging the height adjustment mechanism 20.

Figure 10A:
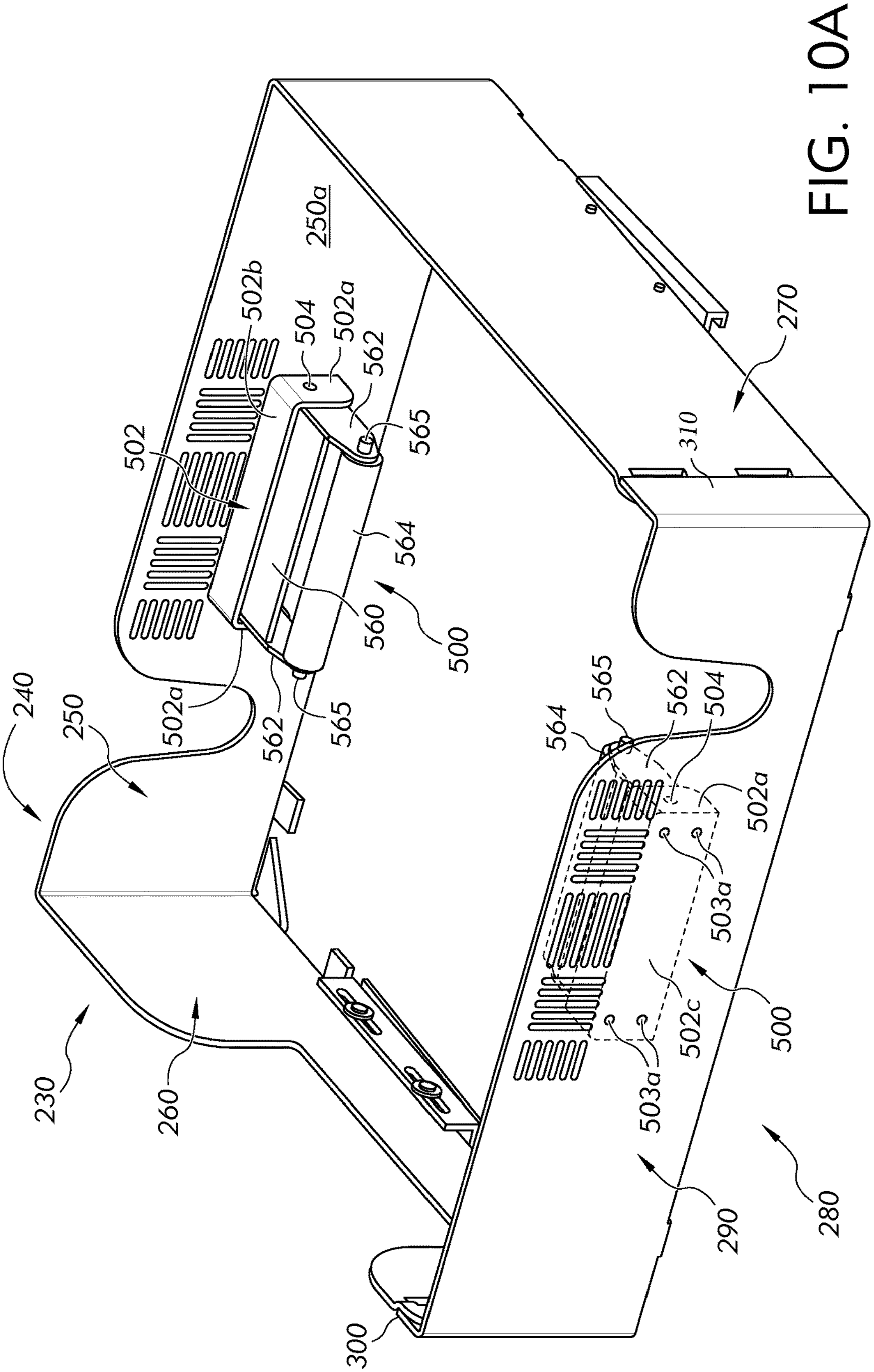
FIG. 10A is a perspective view of the cladding protection device, according to a third embodiment, wherein the cladding protection device includes opposite facing biasing mechanisms, according to a second embodiment.
Figure 10B:
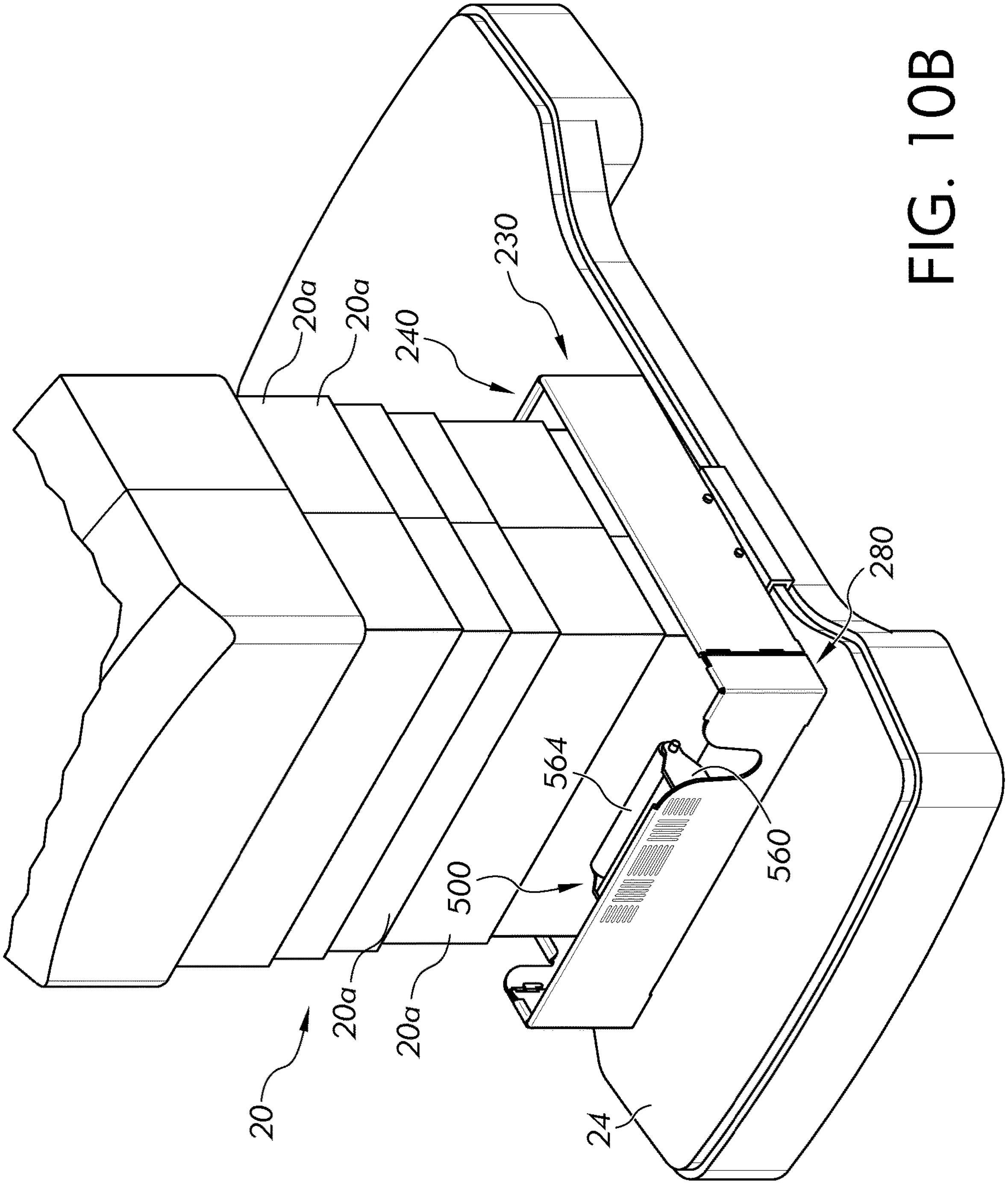
FIG. 10B is a perspective view of the cladding protection device of FIG. 10A installed about a perimeter of a height adjustment mechanism of a surgical table.

Turning now to FIGS. 10A-10B, the cladding protection device 230 according to a third embodiment will now be described. The cladding protection device 230 is essentially the same as the cladding protection device 130 of the second embodiment. Thus, similar references numbers (+100) will be used for similar features. A description of similar features has also been omitted for brevity.

The cladding protection device 230 includes a first guard 240 and a second guard 280. The first guard 240 includes a central wall 250, a first side wall 260, and a second side wall 270, and the second guard 280 includes a central wall 290, a first side wall 300, and a second side wall 310. The cladding protection device 230 includes biasing mechanisms 500, according to a second embodiment. The biasing mechanisms 500 are attached to respective central walls 250 and 290 of the first and second guards 240 and 280. The biasing mechanisms 500 will be described referring to the biasing mechanism 500 attached to the central wall 250 of the first guard 240. It should be appreciated that the following description similarly applies to the biasing mechanism 500 attached to the central wall 290 of the second guard 280.

The biasing mechanism 500, in general, includes a frame 502 having opposing side walls 502*a*, a top plate 502*b* and a rear plate 502*c*. The rear plate 502*c* may include holes 503*a* that are dimensioned to receive fasteners (not shown) to secure the frame 502 to the inner surface 250*a* of the central wall 250. It is contemplated that the frame 502 may be secured to the central wall 250 using other fastening methods, for example but not limited to, welding.

A support bracket 560 is pivotally connected to the opposing side walls 502*a* via a pivot pin or shaft 504. The support bracket 560 is configured to pivot between a vertical position (not shown) and a horizontal or default position (as shown). The shaft 504 may be spring biased to urge the support bracket 560 to the default position.

The support bracket 560 may include a body having a pair of arms 562 that extend outwardly from the body. A roller 564 may be rotatably mounted to the arms 562 via a shaft 565 extending between the arms 562. It is contemplated that the roller 564 may be made from a non-marring material (e.g., rubber) to hinder the roller 564 from scratching or otherwise damaging a respective side of the height adjustment mechanism 20 (FIG. 10B).

Referring to FIG. 10B, the cladding protection device 230 will now be described with respect to assembling the device 230 about the height adjustment mechanism 20. Because the method of assembling the device 230 is essentially the same as described above for the devices 30, 130, only differences from the foregoing description for the devices 30, 130 will be provided for brevity.

During the placement of each guard 240 or 280 on the base 24 about the height adjustment mechanism 20, the respective support bracket 560 with the roller 564 may be pushed downward. Because the support bracket 560 is biased to move toward the default or horizontal position, releasing the support bracket 560 will cause the roller 564 to engage the respective side of the height adjustment mechanism 20 to a final resting position (e.g., the default position as shown or an intermediate positioned between the default position and the vertical position (not shown)). This engagement between the rollers 564 and the respective sides of the height adjustment mechanism 20 helps hinder the cladding protection device 230 from moving with respect to the height adjustment mechanism 20.

As noted above, when the height adjustment mechanism 20 is lowered, the upper telescoping shroud members 20*a* of the height adjustment mechanism 20 will descend downwardly thereby increasing the width of the height adjustment mechanism 20 relative to the cladding protection device. This will cause the descending (wider) shroud members 20*a* to engage against the rollers 564, thereby forcing the rollers 564 and support brackets 560 to pivot downwardly. Because the support brackets 560 are biased to the default position, as the rollers 564 are forced to the offset position they will apply a reactionary force to the cladding protection device 230 that hinders the cladding protection device 130 from moving toward to the height adjustment mechanism 20. As noted above, this force helps to hinder the cladding protection device 130 from engaging the shroud members 20*a* and causing damage. As noted above, it is contemplated that the rollers 564 may be made with or covered with a non-marring material to reduce the likelihood of damaging the height adjustment mechanism 20.

In some embodiments, it is also contemplated that the respective sides of the height adjustment mechanism 20 may dimensionally prevent the support brackets 560 and rollers 564 from moving or rolling to the default or horizontal position. For instance, a wider height adjustment mechanism (not shown) may only allow the support brackets 560 and rollers 564 to move toward an intermediate position (not shown), e.g., somewhere between the vertical position (not shown) and the default position. In this manner, the biasing mechanisms described herein are adaptable to cooperate with height adjustment mechanisms 20 having varying dimensions.

Figure 11B:
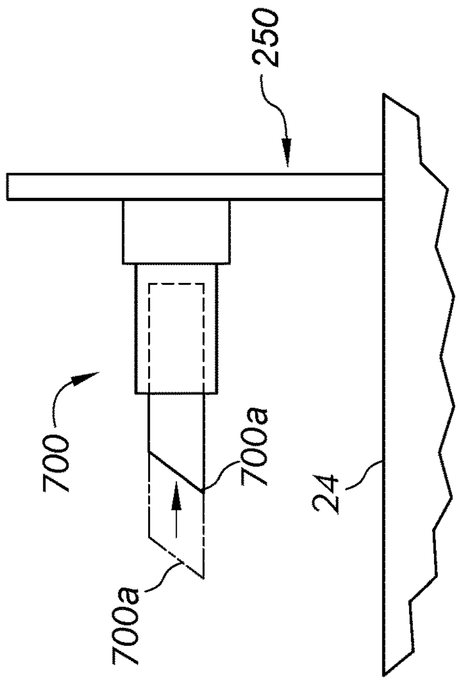
FIG. 11B is a side view of a biasing mechanism, according to a fourth embodiment.
Figure 11C:
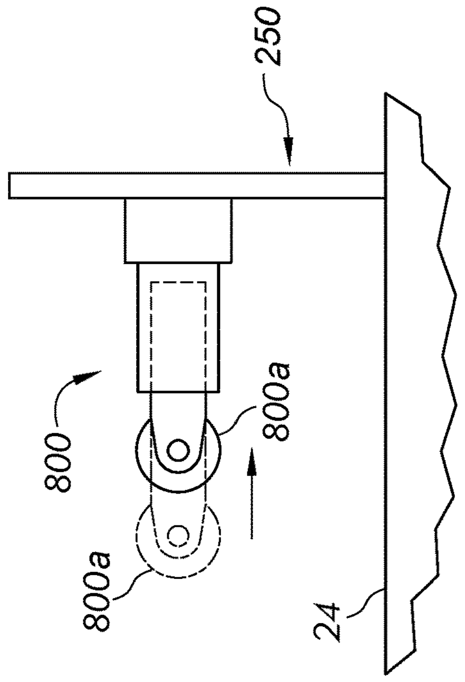
FIG. 11C is a side view of a biasing mechanism, according to a fifth embodiment.
Figure 11A:
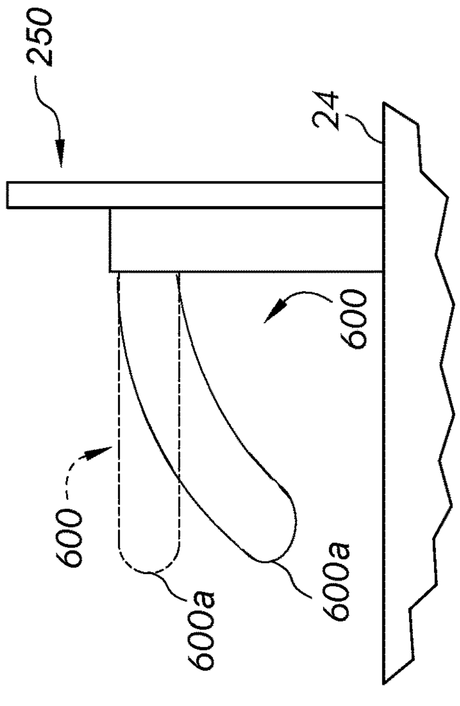
FIG. 11A is a side view of a biasing mechanism, according to a third embodiment.

It is also contemplated that the biasing mechanisms described herein may take on different forms without departing from the scope of the present disclosure. For example, and referring to FIGS. 11A-11C, biasing mechanisms according to three additional embodiments will now be described in relation to the central wall 250 of the cladding protection device 230 of the second embodiment. It should be appreciated that the following description also applies to biasing mechanisms mounted on the other central wall 290 of the cladding protection device 230.

A biasing mechanism 600, according to a third embodiment, may embody an elastic element (e.g., a resilient flap) attached to the central wall 250. In this embodiment, a distal end 600*a* of the biasing mechanism 600 is configured to engage against a respective side of the height adjustment mechanism 20 (FIG. 10B). In use, the distal end 600*a* is elastically deformed against the descending shroud members 20*a* (FIG. 9G) of the height adjustment mechanism 20 (FIG. 9G) when the patient support surface 12 (FIG. 2) is lowered. In this manner, the biasing mechanism 600 will continue to hinder the cladding protection device 230 (FIG. 10B) from moving toward to the height adjustment mechanism 20 (FIG. 10B).

A biasing mechanism 700, according to a fourth embodiment, may embody a telescoping cylinder (e.g., a gas strut, spring-loaded piston) affixed to the central wall 250. In this embodiment, the biasing mechanism 700 is compressible in a horizontal direction, e.g., toward the central wall 250. A distal end 700*a* of the biasing mechanism 700 is configured to engage against a respective side of the height adjustment mechanism 20 (FIG. 10B). In use, the distal end 700*a* is urged inwardly (e.g., in a horizontal direction) by the descending shroud members 20*a* (FIG. 9G) when the patient support surface 12 (FIG. 2) is lowered. In the embodiment shown, a distal end 700*a* of the biasing mechanism is chamfered to facilitate engagement with the descending shroud members 20*a* (FIG. 9G) of the height adjustment mechanism 20 (FIG. 9G).

A biasing mechanism 800, according to a fifth embodiment, may embody a telescoping cylinder with a roller 800*a* rotatably mounted to a distal end thereof. The roller 800*a* is configured to engage against a respective side of the height adjustment mechanism 20 (FIG. 10B). In use, the roller 800*a* is urged inwardly (e.g., in a horizontal direction) by the descending shroud members 20*a* (FIG. 9G) when the patient support surface (FIG. 2) is lowered. Accordingly, it is contemplated that a variety of biasing mechanisms may be adapted to hinder the cladding protection device from moving relative to the height adjustment mechanism (FIG. 10B).

In the various embodiments described herein, the example biasing mechanisms, couplers, and mounting feet are shown in relation to cladding protection devices with slots and projections configured to couple the respective first and second guards to each other. Yet it should be understood that the various biasing mechanisms, couplers, and mounting feet described herein may be adapted for use with cladding protection devices including other examples of coupling elements (e.g., clips, hooks, catches, keys, snaps, hinges, grooves, holes, clasps, magnetic elements, elastic elements, etc.) and mating coupling elements (e.g., clips, hooks, catches, keys, snaps, hinges, grooves, holes, clasps, magnetic elements, elastic elements, etc.) for securing the respective guards of the cladding protection devices to each other.

In summary, a self-supporting cladding protection device includes first and second guards that are couplable to one another to bound a vertically extending height adjustment mechanism of a hospital-use table. Each guard may include coupling elements and mating coupling elements at distal ends thereof to mate with one another to thereby maintain a coupling of the guards to one another. In some embodiments, biasing mechanisms extend from the guards to engage the height adjustment mechanism when the cladding protection device is assembled thereabout. These mechanisms assist in keeping the cladding protection device aligned and in position about the height adjustment mechanism. The coupling of the guards includes attaching one end of each guard to one another and pivoting at least one guard relative to the other guard about the height adjustment mechanism. The pivoting brings the other end of each guard into contact with one another for a secondary coupling.

The invention has been described with reference to the example embodiments described above. Modifications and alterations will occur to others upon a reading and understanding of this specification and can be made thereto without departing from the spirit and scope of the invention set forth in the appended claims. Example embodiments incorporating one or more aspects of the invention are intended to include all such modifications and alterations insofar as they come within the scope of the appended claims and their equivalents. Further, any one aspect of one embodiment may be used with any one feature of another embodiment.

What is claimed is:

1. A cladding protection device for placement around a column, the cladding protection device comprising:

a first guard and a second guard, wherein the first guard and the second guard are couplable to one another to bound a central area dimensioned to receive the column, the first guard including a slot and the second guard comprising a wall including a projection extending from a distal end of said wall, wherein the projection is configured to engage the slot to thereby couple the first guard to the second guard, and the projection is skewed inwardly at an acute angle with respect to said wall toward a center of the central area to enable the projection to engage the slot.

2. The cladding protection device of claim 1, wherein the projection is L-shaped having a tab extending from a horizontal portion of the projection.

3. The cladding protection device of claim 1, wherein the slot is formed in a distal end of the first guard, and the projection extends from a distal end of the second guard.

4. The cladding protection device of claim 1, wherein the first guard further includes a second slot and the second guard includes a second projection, the second projection configured to engage the second slot.

5. The cladding protection device of claim 1, wherein at least one of the first guard and second guard includes a channel configured to receive an edge of a base from which the column extends.

6. The cladding protection device of claim 1, wherein a biasing mechanism is configured to biasingly engage one side of the column.

7. The cladding protection device of claim 1, wherein the first guard includes a coupling element and the second guard includes a mating coupling element and the coupling element and the mating coupling element are configured to define a pivot axis of the first guard and the second guard when the coupling element engages the mating coupling element.

8. The cladding protection device of claim 1, wherein at least one of the first guard and the second guard includes a mounting foot for engaging a base from which the column extends.

9. A surgical table comprising:

a patient support surface and a base, a column extending between the base and the patient support surface, and the cladding protection device of claim 1, wherein the cladding protection device is installed about the column.

10. A cladding protection device for placement around a column, the cladding protection device comprising:

a first guard including a coupling element;

a second guard including a mating coupling element, wherein the coupling element is configured to engage the mating coupling element to couple the first guard to the second guard to bound a central area dimensioned to receive the column; and a biasing mechanism attached to at least one of the first guard and the second guard, the biasing mechanism being configured to biasingly engage a side of the column, wherein the biasing mechanism is configured to move between a first position and a second position.

11. The cladding protection device of claim 10, wherein the biasing mechanism includes a distal end that is biased away from the respective guard toward a center of the central area.

12. The cladding protection device of claim 11, wherein the distal end of the biasing mechanism includes a non-marring material.

13. The cladding protection device of claim 11, wherein the distal end of the biasing mechanism is pivotally biased toward the center of the central area.

14. The cladding protection device of claim 11, wherein the biasing mechanism includes a roller mounted on the distal end.

15. The cladding protection device of claim 11, wherein at least one of the first guard and the second guard includes a channel configured to receive an edge of a base from which the column extends.

16. The cladding protection device of claim 15, wherein the channel is movable relative to an adjacent surface of the at least one of the first guard and the second guard.

17. The cladding protection device of claim 10, further comprising a second biasing mechanism attached to the other of the first guard or the second guard, the second biasing mechanism being configured to biasingly engage an adjacent side of the column.

18. The cladding protection device of claim 10, wherein the biasing mechanism is configured to pivot between the first position and the second position.

* * * * *